(12) United States Patent
Mori

(10) Patent No.: US 7,680,577 B2
(45) Date of Patent: Mar. 16, 2010

(54) ESTIMATING METHOD FOR ROAD FRICTION COEFFICIENT AND VEHICLE SLIP ANGLE ESTIMATING METHOD

(75) Inventor: Atsushi Mori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 11/204,997

(22) Filed: Aug. 17, 2005

(65) Prior Publication Data
US 2006/0041365 A1 Feb. 23, 2006

(30) Foreign Application Priority Data
Aug. 19, 2004 (JP) ............... 2004-240039
Aug. 20, 2004 (JP) ............... 2004-240255

(51) Int. Cl.
*B60T 8/00* (2006.01)
*B60T 8/172* (2006.01)
*B60T 8/1763* (2006.01)
*B60T 8/1764* (2006.01)

(52) U.S. Cl. ............... 701/70; 701/69; 701/71; 701/72; 701/80; 701/82

(58) Field of Classification Search ............... 701/1, 701/29, 36, 56, 65, 71, 72, 73, 74, 75, 80, 701/82, 90
See application file for complete search history.

(56) References Cited

U.S. PATENT DOCUMENTS

| | | | | |
|---|---|---|---|---|
| 4,902,076 A * | 2/1990 | Ushijima et al. | ............ | 303/146 |
| 5,116,254 A * | 5/1992 | Sano et al. | ............ | 180/412 |
| 5,357,798 A * | 10/1994 | Weinzerl et al. | ............ | 73/146 |
| 5,386,365 A * | 1/1995 | Nagaoka | ............ | 701/44 |
| 5,508,929 A * | 4/1996 | Harada | ............ | 701/48 |
| 5,615,117 A * | 3/1997 | Serizawa | ............ | 701/42 |
| 5,711,024 A * | 1/1998 | Wanke | ............ | 701/82 |
| 5,732,379 A * | 3/1998 | Eckert et al. | ............ | 701/83 |
| 5,862,503 A * | 1/1999 | Eckert et al. | ............ | 701/78 |
| 6,059,067 A * | 5/2000 | Shibahata et al. | ............ | 180/338 |
| 6,125,319 A * | 9/2000 | Hac et al. | ............ | 701/80 |
| 6,141,618 A * | 10/2000 | Yamashita et al. | ............ | 701/84 |
| 6,188,316 B1 * | 2/2001 | Matsuno et al. | ............ | 340/441 |
| 6,549,842 B1 * | 4/2003 | Hac et al. | ............ | 701/80 |
| 6,697,728 B2 * | 2/2004 | Kin et al. | ............ | 701/70 |
| 6,988,779 B2 * | 1/2006 | Amanuma et al. | ............ | 303/152 |
| 2002/0007661 A1 * | 1/2002 | Takahashi | ............ | 73/9 |

(Continued)

FOREIGN PATENT DOCUMENTS

EP 0 444 772 A2 9/1991

(Continued)

*Primary Examiner*—Jack W. Keith
*Assistant Examiner*—Jonathan M Dager
(74) *Attorney, Agent, or Firm*—Westerman, Hattori, Daniels & Adrian, LLP

(57) ABSTRACT

The estimating method for a road friction coefficient $\mu$ includes the steps of detecting a steering angle by a steering angle sensor; detecting a lateral acceleration by a lateral acceleration sensor; and calculating an approximate friction coefficient $\mu$ by referring to a road friction coefficient $\mu$ determination table where a plurality of regions each composed of steering angle and lateral acceleration are defined so as to respectively correspond to a plurality of road friction coefficients $\mu i$ (i=1 to n, n is an integer not less than 2) on the basis of a boundary line derived from lower limits of the lateral acceleration over various values of the steering angle, and by specifying one of said regions according to the steering angle detected by said steering angle sensor and the lateral acceleration detected by said lateral acceleration sensor to thereby specify one of said road friction coefficients $\mu i$ as said approximate friction coefficient $\mu$.

12 Claims, 18 Drawing Sheets

U.S. PATENT DOCUMENTS

| | | | |
|---|---|---|---|
| 2002/0072842 A1* | 6/2002 | Kogure | 701/80 |
| 2002/0087251 A1* | 7/2002 | Kogure et al. | 701/80 |
| 2003/0040849 A1* | 2/2003 | Hathout et al. | 701/1 |
| 2003/0089542 A1* | 5/2003 | Mori | 180/197 |
| 2003/0093190 A1* | 5/2003 | Mori | 701/1 |
| 2003/0195689 A1 | 10/2003 | Mori | |
| 2004/0148077 A1* | 7/2004 | Yasui et al. | 701/41 |
| 2005/0012501 A1* | 1/2005 | Isono et al. | 324/300 |

FOREIGN PATENT DOCUMENTS

| | | |
|---|---|---|
| EP | 1 275 937 A2 | 1/2003 |
| JP | 2003-146199 | 5/2003 |
| JP | 2003-306092 | 10/2003 |
| JP | 2003-306092 A | 10/2003 |

* cited by examiner

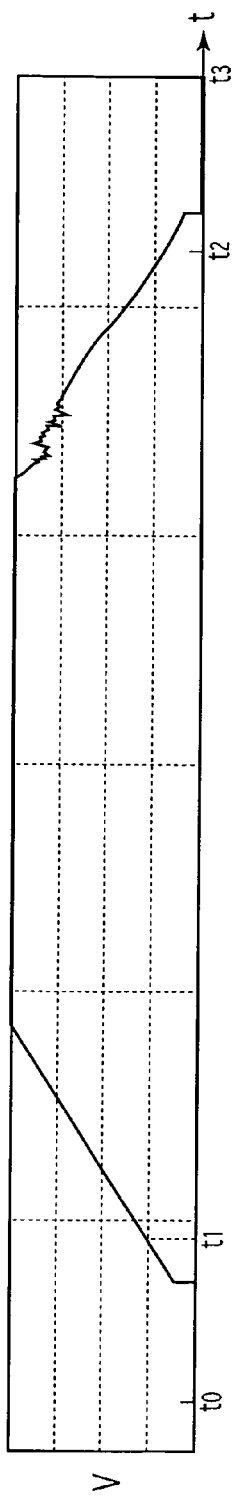
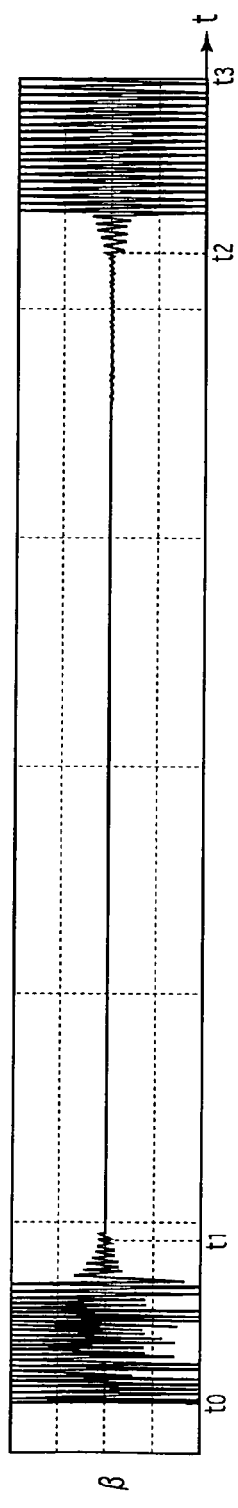
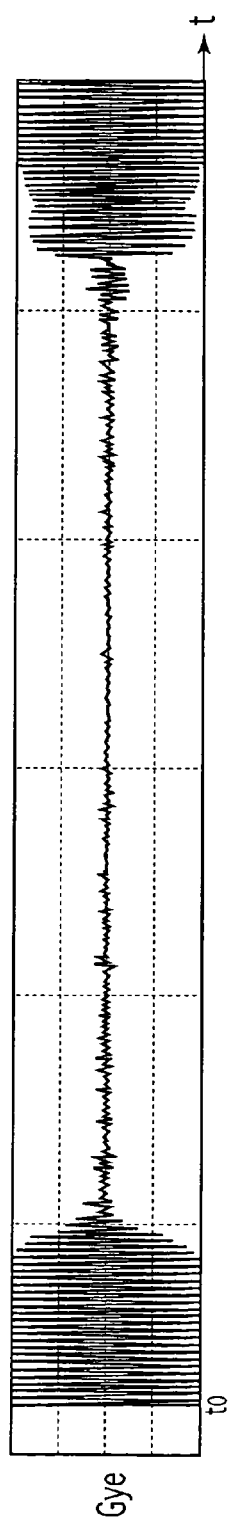

ESTIMATING METHOD FOR ROAD FRICTION COEFFICIENT AND VEHICLE SLIP ANGLE ESTIMATING METHOD

BACKGROUND OF THE INVENTION

1. Field of the Invention

The present invention relates to an estimating method for a road friction coefficient $\mu$, and more particularly to an estimating method for a road friction coefficient $\mu$ in which the road friction coefficient $\mu$ can be easily computed and a practical accuracy of estimation can be ensured. Further, the present invention relates to a vehicle slip angle estimating method, and more particularly to a vehicle slip angle estimating method for estimating a vehicle slip angle by regressively using a previous estimated value of the vehicle slip angle in calculating a present estimated value of the vehicle slip angle on the basis of a vehicle dynamic model calculated by the road friction coefficient $\mu$.

2. Description of the Related Art

In controlling a motional condition of a vehicle, such as a turning motion, it is known to improve the vehicle dynamics by using an angle (slip angle $\beta$) formed between a running direction of the vehicle and a longitudinally extending center line of the vehicle to perform optimum torque distribution control or the like.

As a method of estimating a slip angle $\beta$, Patent Document of Japanese Patent Publication No. 2003-306092 discloses a slip angle estimating method using a lateral force acting on a rear wheel in a lateral direction of a vehicle on the basis of a tire dynamic model.

According to the method disclosed in Japanese Patent Publication No. 2003-306092, a road friction coefficient $\mu$ is first estimated by performing proportional-integral-derivative (PID) action to calculate an adjusting value for adjusting an initial value of the road friction coefficient $\mu$ so that the difference between a lateral acceleration detected by a lateral acceleration sensor and a lateral acceleration estimated according to a previous estimated value of a slip angle derivative $\beta'$, a detected vehicle speed V, and a detected yaw rate r becomes zero, and then adding the adjusting value calculated above to the initial value near 1.

A lateral force (tire lateral force Yr) acting on a rear wheel is calculated by using an estimated value of the road friction coefficient $\mu$ and a previous estimated value of the slip angle $\beta$ on the basis of a tire dynamic model. Then, the tire lateral force Yr calculated above, an angular velocity (yaw rate r) about a vertical axis passing through the center of gravity of the vehicle as detected by a yaw rate sensor, a derivative r' of the yaw rate r, and a vehicle speed V detected by a vehicle speed sensor are inserted into Eq. (1) shown below to estimate a derivative (slip angle derivative $\beta'$) of the slip angle $\beta$ with respect to time.

$$\beta' = -2(Lf+Lr)Yr/mVLf+Ir'/mVLf-r-M/mVLf \quad (1)$$

where Lf is the distance from the center of gravity of the vehicle to the front axle, Lr is the distance from the center of gravity of the vehicle to the rear axle, Yr is the tire lateral force, r' is the yaw rate derivative, m is the total mass of the vehicle, I is the yawing moment of inertia, and M is the yawing moment.

An estimated value of the slip angle derivative $\beta'$ is integrated with respect to time to estimate a present value of the slip angle $\beta$. By using the present estimated value of the slip angle derivative $\beta'$, a lateral acceleration is estimated. Further, by regressively using the present estimated value of the slip angle $\beta$, a next value of the tire lateral force Yr is calculated, and by using this next value of the tire lateral force Yr, next values of the slip angle derivative $\beta'$ and the slip angle $\beta$ are estimated.

As mentioned above, integration is performed by an integrator provided in a PID controller in estimating the road friction coefficient $\mu$, and the slip angle derivative $\beta'$ is integrated by another integrator in estimating the slip angle $\beta$. Thus, the two integrators are used for the estimation of the road friction coefficient $\mu$ and the slip angle.

A signal to be integrated includes a sensor signal from a vehicle, so that the result of integration includes noise and error, which are accumulated by the integration. Accordingly, the accuracy of estimation may be greatly reduced. In particular, the two integrators are used for the estimation of the road friction coefficient $\mu$ and the slip angle as mentioned above, and the result of integration obtained in estimating one of the road friction coefficient $\mu$ and the slip angle is utilized for the estimation of the other. As a result, it is considered that neither the slip angle $\beta$ nor the road friction coefficient $\mu$ may mathematically converge to true values.

If the slip angle $\beta$ cannot be accurately estimated, the motional condition of a vehicle to be controlled by using the slip angle cannot be accurately controlled. Accordingly, it is desirable that an estimated value of the slip angle is not to be used for the estimation of the road friction coefficient $\mu$ or that the influence of the estimated value of the slip angle is to be suppressed in the case of using the estimated value.

In the conventional vehicle slip angle estimating method mentioned above, the slip angle derivative $\beta'$ and the slip angle $\beta$ are calculated regardless of values of the vehicle speed V. As shown in Eq. (1), however, the vehicle speed V is included in the denominators of the first, second, and fourth terms, so that when the vehicle speed V is decreased, the denominators of the first, second, and fourth terms are decreased and the reciprocal of the vehicle speed V is therefore increased. Further, the increased reciprocal of the vehicle speed V is multiplied by sensor noise or the like to cause a remarkable influence of such sensor noise or the like. Thus, when the vehicle speed V is qualitatively low, the slip angle derivative $\beta'$ becomes large in error. Accordingly, the slip angle $\beta$ as an integral of the slip angle derivative $\beta'$ includes a large error.

Further, the present estimated value of the slip angle $\beta$ is calculated by regressively using the previous estimated value of the slip angle $\beta$ including a large error, and a lateral acceleration is estimated by regressively using the previous estimated value of the slip angle derivative $\beta'$. Accordingly, the errors included in the present estimated values of the slip angle derivative $\beta'$ and the slip angle $\beta$ are superimposed to become larger. As a result, the estimated values of the slip angle derivative $\beta'$ and the slip angle $\beta$ are changed in sign at a frequency of 3 Hz or higher which is inconceivable in a usual vehicle motion, so that the estimated values of the slip angle derivative $\beta'$ and the slip angle $\beta$ are diverged.

FIGS. 20A, 20B, and 20C are graphs showing the divergence of the slip angle $\beta$. In FIG. 20A, the vertical axis represents vehicle speed V, and the horizontal axis represents time t. In FIG. 20B, the vertical axis represents slip angle $\beta$, and the horizontal axis represents time t. In FIG. 20C, the vertical axis represents estimated lateral acceleration $G_{ye}$, and the horizontal axis represents time t. As shown in FIG. 20A, the vehicle speed is increased from zero at the time t0 and thereafter decreased to zero at the time t3.

As shown in FIGS. 20A and 20B, there is a problem such that the estimated value of the slip angle $\beta$ is changed in sign at a frequency of 3 Hz or higher to cause divergence during a period from the time t0 to the time t1 at which the vehicle speed V reaches a certain speed in increasing the vehicle speed V and during a period from the time t2 at which the vehicle speed V reaches a certain speed in decreasing the vehicle speed V to the time t3. Further, as shown in FIG. 20C, the estimated lateral acceleration $G_{ye}$ calculated by using the slip angle derivative $\beta'$ is also diverged.

Such divergence occurs not only in the vehicle slip angle estimating method using Eq. (1), but also in any other methods of estimating the vehicle slip angle by regressively using the previous estimated value of the vehicle slip angle in calculating the present estimated value of the vehicle slip angle on the basis of a vehicle dynamic model.

The motional condition of the vehicle is controlled by torque control with electromagnetic actuators for the front and rear wheels by using the slip angle $\beta$. Accordingly, the divergence of the slip angle $\beta$ causes large variations in control command, resulting in an increase in frequency of operation of the electromagnetic actuators and the instability of the vehicle behavior. Therefore, the motional condition of the vehicle cannot be well controlled.

SUMMARY OF THE INVENTION

It is therefore an object of the present invention to provide an estimating method for a road friction coefficient $\mu$ in which the road friction coefficient $\mu$ can be easily computed and a practical accuracy of estimation can be ensured.

It is another object of the present invention to provide a vehicle slip angle estimating method which can prevent the divergence of the estimated values of the vehicle slip angle derivative and the vehicle slip angle.

In accordance with a first aspect of the present invention, there is provided an estimating method for a road friction coefficient $\mu$, including the steps of detecting a steering angle by a steering angle sensor; detecting a lateral acceleration by a lateral acceleration sensor; and calculating an approximate friction coefficient $\mu$ by referring to a road friction coefficient $\mu$ determination table where a plurality of regions each composed of steering angle and lateral acceleration are defined so as to respectively correspond to a plurality of road friction coefficients $\mu i$ (i=1 to n, n is an integer not less than 2) on the basis of a boundary line derived from lower limits of the lateral acceleration over various values of the steering angle, and by specifying one of the regions according to the steering angle detected by the steering angle sensor and the lateral acceleration detected by the lateral acceleration sensor to thereby specify one of the road friction coefficients $\mu i$ as the approximate friction coefficient $\mu$.

The approximate friction coefficient $\mu$ relatively close to the road friction coefficient $\mu$ as a coefficient of friction on a road where the vehicle is running is calculated without using an estimated value of a vehicle slip angle $\beta$. Accordingly, it is possible to prevent a reduction in estimation accuracy as in the case of estimating the slip angle and the road friction coefficient $\mu$ by using integration. Further, the road friction coefficient $\mu$ can be estimated by easy computation.

In accordance with a second aspect of the present invention, the estimating method further includes the step of finely adjusting the road friction coefficient $\mu$ on the basis of the approximate friction coefficient $\mu$ so that the difference between an estimated lateral acceleration and the lateral acceleration detected by the lateral acceleration sensor becomes zero.

The result of estimation of the slip angle $\beta$ is merely utilized for fine adjustment of the road friction coefficient $\mu$ in estimating the road friction coefficient $\mu$. Accordingly, the result of estimation of the slip angle $\beta$ has little effect on the estimation of the road friction coefficient $\mu$, so that the estimation accuracy can be retained.

In accordance with a third aspect of the present invention, the step of calculating the approximate friction coefficient $\mu$ includes the step of filtering the steering angle detected by the steering angle sensor and the lateral acceleration detected by the lateral acceleration sensor so that the delay characteristic of the steering angle from the lateral acceleration becomes larger.

The detected steering angle is delayed from the detected lateral acceleration by filtering, so that the delay characteristic of lateral acceleration from steering angle as an inherent characteristic of a vehicle can be canceled. Accordingly, a reduction in estimation accuracy in the case of rapid steering operation or the like can be suppressed.

In accordance with a fourth aspect of the present invention, the estimating method further includes the step of detecting a vehicle speed by a vehicle speed sensor; the road friction coefficient $\mu$ determination table being either one of a plurality of tables prepared on the basis of a plurality of vehicle speeds and selectively used according to the vehicle speed detected by the vehicle speed sensor or a predetermined table using a corrected steering angle obtained by correcting the steering angle detected by the steering angle sensor with a correction coefficient according to the vehicle speed detected by the vehicle speed sensor.

The road friction coefficient $\mu$ estimating method of the present invention further includes the step of detecting a vehicle speed by a vehicle speed sensor. In the case that the plural road friction coefficient $\mu$ determination tables prepared on the basis of a plurality of vehicle speeds are selectively used according to the vehicle speed detected by the vehicle speed sensor, the accuracy of the approximate friction coefficient $\mu$ can be improved by increasing the number of tables to be prepared. On the other hand, in the case that the predetermined table using a corrected steering angle obtained by correcting the steering angle detected by the steering angle sensor with a correction coefficient according to the vehicle speed detected by the vehicle speed sensor is adopted as the road friction coefficient $\mu$ determination table, the table can be easily prepared and the approximate friction coefficient $\mu$ can be accurately calculated.

In accordance with a 5th aspect of the present invention, the estimating method further includes the step of detecting a vehicle speed by a vehicle speed sensor; the step of calculating the approximate friction coefficient $\mu$ including the step of stopping the change of the approximate friction coefficient $\mu$ when the vehicle speed detected by the vehicle speed sensor is not greater than a predetermined value.

When the vehicle speed detected by the vehicle speed sensor is not greater than the predetermined value, the change of the approximate friction coefficient $\mu$ is stopped. For example, when the steering wheel is turned in the stop condition of the vehicle, the lateral acceleration detected by the lateral acceleration sensor remains zero. In this case, the estimation of the approximate friction coefficient $\mu$ is stopped to thereby avoid decreasing of the estimated value of the approximate friction coefficient $\mu$ to a minimum value.

In accordance with a 6th aspect of the present invention, the step of calculating the approximate friction coefficient $\mu$ includes the step of decreasing the approximate friction coefficient $\mu$ when the approximate friction coefficient $\mu$ stays for more than a predetermined time in the region where it is smaller than a present estimated value of the approximate friction coefficient $\mu$.

When the approximate friction coefficient μ estimated according to the steering angle detected by the steering angle sensor and the lateral acceleration detected by the lateral acceleration sensor stays for more than the predetermined time in the region where it is smaller than the present estimated value of the approximate friction coefficient μ, the approximate friction coefficient μ to be set is decreased. Accordingly, the influences of sensor noise and vehicle running condition can be avoided to thereby allow accurate estimation of the approximate friction coefficient μ.

In accordance with a 7th aspect of the present invention, the road friction coefficients μi (i=1 to n) are defined with a predetermined step set between any adjacent ones of the road friction coefficients μi; and the absolute value of each of upper and lower limits of a fine adjusting value used in the step of finely adjusting the road friction coefficient μ is equal to or greater than the predetermined step.

The plural road friction coefficients μi (i=1 to n) are defined with a predetermined step set between any adjacent ones of the road friction coefficients μi, and the absolute value of each of the upper and lower limits of the fine adjusting value used in the friction coefficient μ fine adjusting step is equal to or greater than the predetermined step. Accordingly, the range of the fine adjusting value is reduced to thereby improve the estimation accuracy of the road friction coefficient μ.

In accordance with an 8th aspect of the present invention, the step of finely adjusting the road friction coefficient μ includes the step of performing the fine adjustment of the road friction coefficient μ when the lateral acceleration detected by the lateral acceleration sensor is not greater than a present estimated value of the approximate friction coefficient μ multiplied by a constant value.

When the lateral acceleration detected by the lateral acceleration sensor is greater than the present estimated value of the approximate friction coefficient μ multiplied by the constant value, the fine adjustment of the road friction coefficient μ is stopped, so that a reduction in estimation accuracy can be prevented. When the detected lateral acceleration is greater than the present estimated value of the approximate friction coefficient μ multiplied by the constant value, the influence of tire nonlinearity is large and the fine adjustment of the road friction coefficient μ is effectively performed.

In accordance with a 9th aspect of the present invention, the step of finely adjusting the road friction coefficient μ includes the steps of determining whether or not the present estimated value of the approximate friction coefficient μ has varied and resetting the fine adjusting value to zero when the present estimated value has varied.

When the present estimated value of the approximate friction coefficient μ has varied, the fine adjusting value is reset to zero. Accordingly, the estimation accuracy in the case of variations in the approximate friction coefficient μ can be improved.

In accordance with a 10th aspect of the present invention, the step of finely adjusting the road friction coefficient μ includes the step of stopping the fine adjustment of the road friction coefficient μ when counter steer has been detected.

When the counter steer has been detected, the fine adjustment of the road friction coefficient μ is stopped because the accuracy of an estimated lateral acceleration is largely reduced upon detection of the counter steer and the fine adjustment of the road friction coefficient μ cannot be expected. Therefore, by stopping the fine adjustment in this case, a reduction in estimation accuracy can be prevented.

In accordance with an 11th aspect of the present invention, the step of calculating the approximate friction coefficient μ includes the steps of detecting a straight running condition and increasing the approximate friction coefficient μ when the straight running condition has been detected for more than a predetermined time.

When the straight running condition has been detected for more than the predetermined time, the approximate friction coefficient μ to be set is increased. Accordingly, it is possible to prevent that the estimated value of the approximate friction coefficient μ may become excessively small, thus preventing a reduction in estimation accuracy of the approximate friction coefficient μ.

In accordance with a 12th aspect of the present invention, the step of calculating the approximate friction coefficient μ includes the step of increasing the approximate friction coefficient μ when the lateral acceleration detected by the lateral acceleration sensor is greater than a present estimated value of the approximate friction coefficient μ.

When the lateral acceleration detected by the lateral acceleration sensor becomes greater than the present estimated value of the approximate friction coefficient μ, the approximate friction coefficient μ to be set is increased because there is usually no possibility of generation of a lateral acceleration larger than the road friction coefficient μ. Accordingly, also in this case, it is possible to prevent that the estimated value of the approximate friction coefficient μ may become excessively small.

In accordance with a 13th aspect of the present invention, there is provided a vehicle slip angle estimating method for estimating a vehicle slip angle defined as an angle formed between a running direction of a vehicle and a longitudinal axis of said vehicle by regressively using a previous estimated value of the vehicle slip angle in calculating a present estimated value of the vehicle slip angle on the basis of a vehicle dynamic model calculated by using a road friction coefficient μ, said vehicle slip angle estimating method comprising the steps of: detecting a steering angle by a steering angle sensor; detecting a lateral acceleration by a lateral acceleration sensor; calculating an approximate friction coefficient μ of said road friction coefficient μ by referring to a road friction coefficient μ determination table where a plurality of regions each composed of steering angle and lateral acceleration are defined so as to respectively correspond to a plurality of road friction coefficients μi (i=1 to n, n is an integer not less than 2) on the basis of a boundary line derived from lower limits of the lateral acceleration over various values of the steering angle, and by specifying one of said regions according to the steering angle detected by said steering angle sensor and the lateral acceleration detected by said lateral acceleration sensor to thereby specify one of said road friction coefficients μi as said approximate friction coefficient μ; detecting a vehicle speed of said vehicle; determining whether or not said vehicle speed is less than or equal to a predetermined speed; and forcibly resetting said present estimated value of said vehicle slip angle to zero when said vehicle speed is less than or equal to said predetermined speed, thereby preventing the divergence of said present estimated value of said vehicle slip angle.

When the vehicle speed is less than or equal to the predetermined speed, the present estimated value of the vehicle slip angle is forcibly reset to zero. Accordingly, the divergence of the present estimated value of the vehicle slip angle can be prevented, thereby preventing the divergence of a controlled variable in a motional condition of the vehicle using the present estimated value of the vehicle slip angle.

In accordance with a 14th aspect of the present invention, there is provided a vehicle slip angle estimating method for estimating a vehicle slip angle defined as an angle formed between a running direction of a vehicle and a longitudinal axis of said vehicle by regressively using a previous estimated value of said vehicle slip angle in calculating a present estimated value of said vehicle slip angle on the basis of a vehicle dynamic model calculated by using a road friction coefficient μ, said vehicle slip angle estimating method comprising the steps of: detecting a steering angle by a steering angle sensor; detecting a lateral acceleration by a lateral acceleration sensor; calculating an approximate friction coefficient μ of said road friction coefficient μ by referring to a road friction coefficient μ determination table where a plurality of regions each composed of steering angle and lateral acceleration are defined so as to respectively correspond to a plurality of road friction coefficients μi (i=1 to n, n is an integer not less than 2) on the basis of a boundary line derived from lower limits of the lateral acceleration over various values of the steering angle, and by specifying one of said regions according to the steering angle detected by said steering angle sensor and the lateral acceleration detected by said lateral acceleration sensor to thereby specify one of said road friction coefficients μi as said approximate friction coefficient μ; estimating a vehicle slip angle derivative on the basis of said vehicle dynamic model; detecting a vehicle speed of said vehicle; determining whether or not said vehicle speed is less than or equal to a predetermined speed; forcibly resetting the present estimated value of said vehicle slip angle derivative to zero when said vehicle speed is less than or equal to said predetermined speed, thereby preventing the divergence of said present estimated value of said vehicle slip angle derivative; and integrating said present estimated value of said vehicle slip angle derivative with respect to time, thereby obtaining said present estimated value of said vehicle slip angle so that when said vehicle speed is less than or equal to said predetermined speed, said present estimated value of said vehicle slip angle becomes zero, whereas when said vehicle speed is greater than said predetermined speed, said present estimated value of said vehicle slip angle becomes an integral of said present estimated value of said vehicle slip angle derivative.

When the vehicle speed is less than or equal to the predetermined speed, the present estimated value of the vehicle slip angle derivative is forcibly reset to zero, and the present value of the vehicle slip angle is estimated to zero, whereas when the vehicle speed is greater than the predetermined speed, the present estimated value of the vehicle slip angle derivative is integrated with respect to time, and the resultant integral is estimated as the present value of the vehicle slip angle. Accordingly, the divergence of the present estimated values of the vehicle slip angle derivative and the vehicle slip angle can be prevented, thereby preventing the divergence of a controlled variable in a motional condition of the vehicle using the present estimated value of the vehicle slip angle.

In accordance with a 15th aspect of the present invention, the step of estimating the vehicle slip angle derivative includes the steps of estimating a lateral acceleration by using a previous estimated value of said vehicle slip angle derivative; estimating a coefficient of friction on a road where said vehicle is running so that the difference between an estimated value of said lateral acceleration obtained above and an actual value of said lateral acceleration detected by a lateral acceleration sensor becomes zero; calculating a lateral force acting on a rear wheel in a lateral direction of said vehicle on the basis of said vehicle dynamic model by using an estimated value of said coefficient of friction obtained above and said previous estimated value of said vehicle slip angle; and calculating said present estimated value of said vehicle slip angle derivative according to said lateral force, said vehicle speed, and a yaw rate.

The present lateral acceleration is estimated by regressively using the previous estimated value of the vehicle slip angle and by using the previous estimated value of the vehicle slip angle derivative, and the present estimated value of the vehicle slip angle derivative is calculated by using the present estimated value of the lateral acceleration obtained above. Accordingly, the divergence of the vehicle slip angle can be effectively prevented.

The above and other objects, features and advantages of the present invention as well as the manner of realizing them will become more apparent whereas the invention itself will best understood from a careful study of the following description and appended claims with reference to attached drawings showing some preferred embodiments of the invention.

BRIEF DESCRIPTION OF THE DRAWINGS

FIGS. 20A to 20C are graphs showing the divergence of a slip angle.

DETAILED DESCRIPTION OF THE PREFERRED EMBODIMENTS

Figure 1:
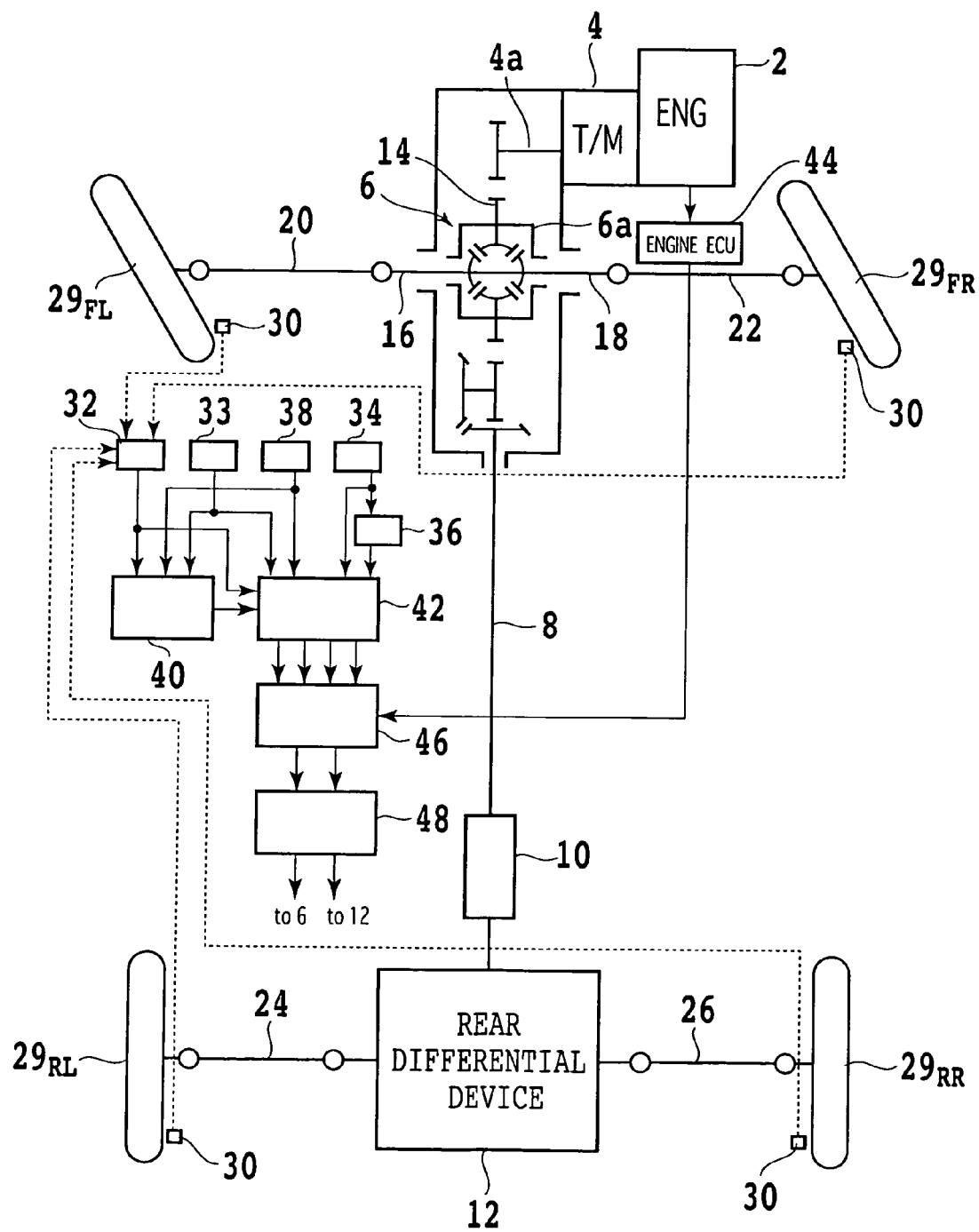
FIG. 1 is a schematic diagram showing a power transmitting system for a four-wheel drive vehicle.

FIG. 1 is a schematic diagram of a power transmitting system for a four-wheel drive vehicle based on a front-engine front-drive (FF) vehicle to which the vehicle slip angle estimating method of the present invention is applicable. As shown in FIG. 1, the power transmitting system mainly includes a front differential device 6 to which the power of an engine 2 located at a front portion of the vehicle is transmitted from an output shaft 4a of a transmission 4, a speed increasing device (speed changing device) 10 to which the power from the front differential device 6 is transmitted through a propeller shaft 8 extending in the longitudinal direction of the vehicle, and a rear differential device 12 to which the power from the speed increasing device 10 is transmitted.

The front differential device 6 has a structure well known in the art, and the power from the output shaft 4a of the transmission 4 is transmitted through a plurality of gears 14 and output shafts 16 and 18 in a differential case 6a to left and right front wheel drive shafts 20 and 22, thereby driving left and right front wheels 29FL and 29FR. Torque control for the front wheels 29FL and 29FR is performed by electromagnetic actuators, for example.

The rear differential device 12 includes a pair of planetary gear sets and a pair of electromagnetic actuators for controlling the engagement of multiplate brake mechanisms (multiplate clutch mechanisms). The electromagnetic actuators in the rear differential device 12 are controlled to transmit the power to left and right rear wheel drive shafts 24 and 26, thereby driving left and right rear wheels 29RL and 29RR.

A plurality of wheel speed sensors 30 are provided for the front wheels 29FL and 29FR and the rear wheels 29RL and 29RR, respectively, to detect the rotational speeds of these wheels. A vehicle speed sensor 32 is provided to detect a vehicle speed V according to the wheel speeds detected by the wheel speed sensors 30 and to output an electrical signal, e.g., a voltage level corresponding to the vehicle speed V.

A lateral acceleration sensor 33 is provided to detect a lateral acceleration Gy as an acceleration applied to the vehicle in its lateral direction and to output an electrical signal, e.g., a voltage level corresponding to the magnitude of the detected lateral acceleration. A yaw rate sensor 34 such as a piezoelectric element and a gyro sensor is provided to detect a yaw rate r, or a change in inclination angle of the vehicle with respect to its longitudinal direction in a horizontal plane or about its vertical axis, and to output an electrical signal, e.g., a voltage level corresponding to the magnitude of the yaw rate r.

A yaw rate derivative calculating section 36 is provided to differentiate the yaw rate r output from the yaw rate sensor 34 with respect to time, thereby calculating a yaw rate derivative r'. An engine ECU 44 is provided to calculate a drive torque according to the rotational speed of the engine 2, for example. A steering angle sensor 38 includes a rotary encoder provided on a steering shaft, for example, and outputs an electrical signal corresponding to the direction and magnitude of a steering angle input from an operator, e.g., a voltage signal indicating a sign and a level.

A counter steer detecting device 40 is provided to detect counter steer such that the lateral acceleration is opposite in direction to the steering angle and to output a counter steer flag CS indicating whether or not the counter steer is on. For example, when the lateral acceleration detected by the lateral acceleration sensor 33 and the steering angle detected by the steering angle sensor 38 are opposite in direction to each other, that is, they are opposite in sign to each other, the on state of the counter steer is determined and the counter steer flag CS is output.

Figure 2:
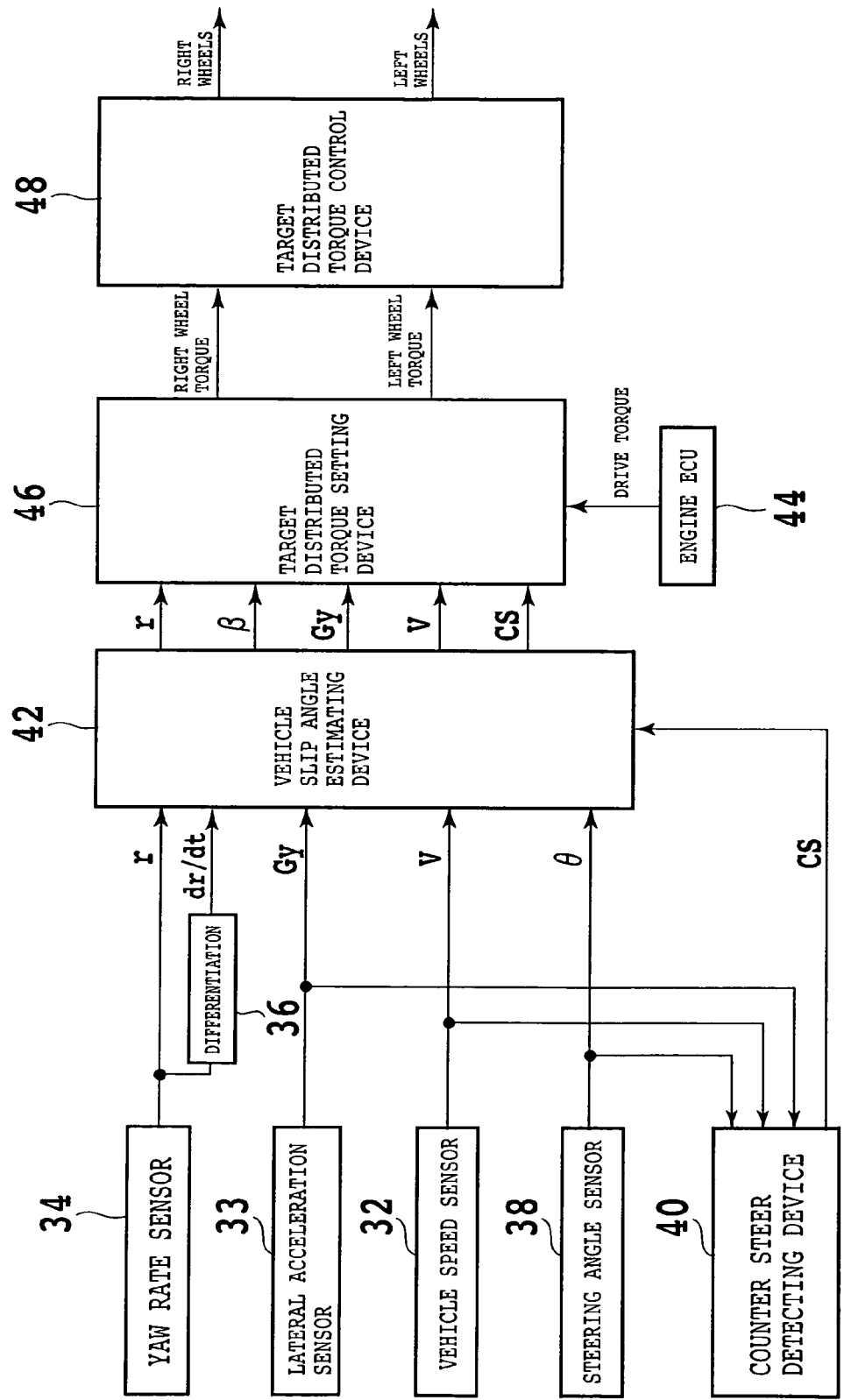
FIG. 2 is a block diagram relating to the control of a motional condition of the vehicle.

FIG. 2 is a block diagram of a system relating to the control of a motional condition of the vehicle. A vehicle slip angle estimating device 42 is provided to perform a vehicle slip angle estimating method for estimating a present value of the vehicle slip angle by estimating a road friction coefficient $\mu$ and regressively using an estimated value of the road friction coefficient $\mu$ and a previous estimated value of the vehicle slip angle in calculating the present estimated value of the vehicle slip angle on the basis of a vehicle dynamic model.

In this preferred embodiment, as will be hereinafter described, the vehicle slip angle estimating device 42 performs a road friction coefficient $\mu$ estimating method so that the difference between a lateral acceleration Gy detected by the lateral acceleration sensor 33 and an estimated lateral acceleration Gye becomes zero, wherein Gye is estimated according to the yaw rate r detected by the yaw rate sensor 34, the yaw rate derivative r' calculated by the yaw rate derivative calculating section 36, and the vehicle speed V detected by the vehicle speed sensor 32. Then, the vehicle slip angle estimating device 42 estimates a present slip angle $\beta$ by regressively using an estimated value of the road friction coefficient $\mu$ obtained above and a previous estimated value of the slip angle $\beta$ on the basis of a tire dynamic model.

The engine ECU 44 calculates a drive torque according to the rotational speed of the engine 2, for example. A target distributed torque setting device 46 is provided to set target values for the torque to be distributed to the right and left front wheels 29FR and 29FL and the right and left rear wheels 29RR and 29RL according to the slip angle $\beta$ estimated by the slip angle estimating device 42, the yaw rate r detected by the yaw rate sensor 34, the lateral acceleration Gy detected by the lateral acceleration sensor 33, the vehicle speed V detected by the vehicle speed sensor 32, the counter steer flag CS output from the counter steer detecting device 40, and the drive torque calculated in the engine ECU 44, then outputting the target torque values to be distributed to the wheels 29FR, 29FL, 29RR, and 29RL to a target distributed torque set device 48.

The target distributed torque controlling device 48 controls currents to be supplied to the electromagnetic actuators respectively provided for the wheels 29FR, 29FL, 29RR, and 29RL according to the target torque values output from the target distributed torque setting device 46.

Figure 3:
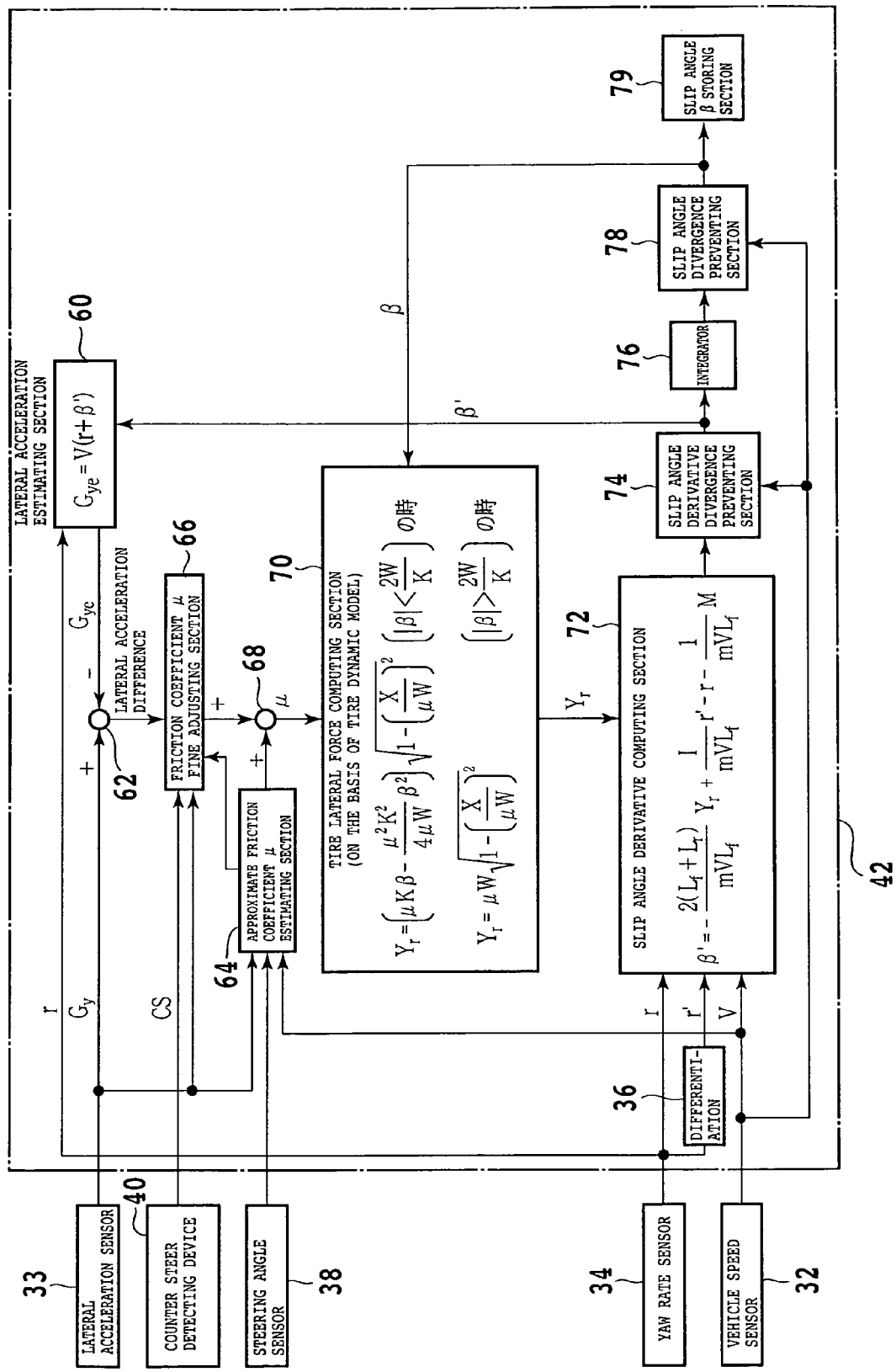
FIG. 3 is a functional block diagram of a vehicle slip angle estimating device according to a preferred embodiment of the present invention.

FIG. 3 is a block diagram of the slip angle estimating device 42. The slip angle estimating device 42 includes a lateral acceleration estimating section 60, a subtracter 62, a an approximate friction coefficient $\mu$ estimating section 64, a friction coefficient $\mu$ fine adjusting section 66, an adder 68, a tire lateral force computing section 70, a slip angle derivative computing section 72, a slip angle derivative divergence preventing section 74, an integrator 76, a slip angle divergence preventing section 78, and a slip angle $\beta$ storing section 79.

The lateral acceleration estimating section 60 calculates an estimated lateral acceleration Gye of the vehicle by applying to Eq. (2) a slip angle derivative $\beta'$ input from the slip angle derivative divergence preventing section 74, the vehicle speed V input from the vehicle speed sensor 32, and the yaw rate r input from the yaw rate sensor 34, and outputs the estimated lateral acceleration Gye to the subtracter 62.

$$Gye = V(r+\beta') \qquad (2)$$

The subtracter 62 subtracts the estimated lateral acceleration Gye input from the lateral acceleration estimating section 60 from the lateral acceleration Gy input from the lateral acceleration sensor 33, and outputs the result of this subtraction to the friction coefficient $\mu$ fine adjusting section 66.

The road friction coefficient $\mu$ estimating method according to this preferred embodiment does not include the step of performing PID action according to an initial value of the road friction coefficient $\mu$ to thereby estimate the road friction coefficient μ, but includes the steps of calculating an approximate friction coefficient μ from an approximate friction coefficient μ determination table 86 to be hereinafter described and then finely adjusting the road friction coefficient μ on the basis of the above approximate friction coefficient μ by the friction coefficient μ fine adjusting section 66.

Figure 4:
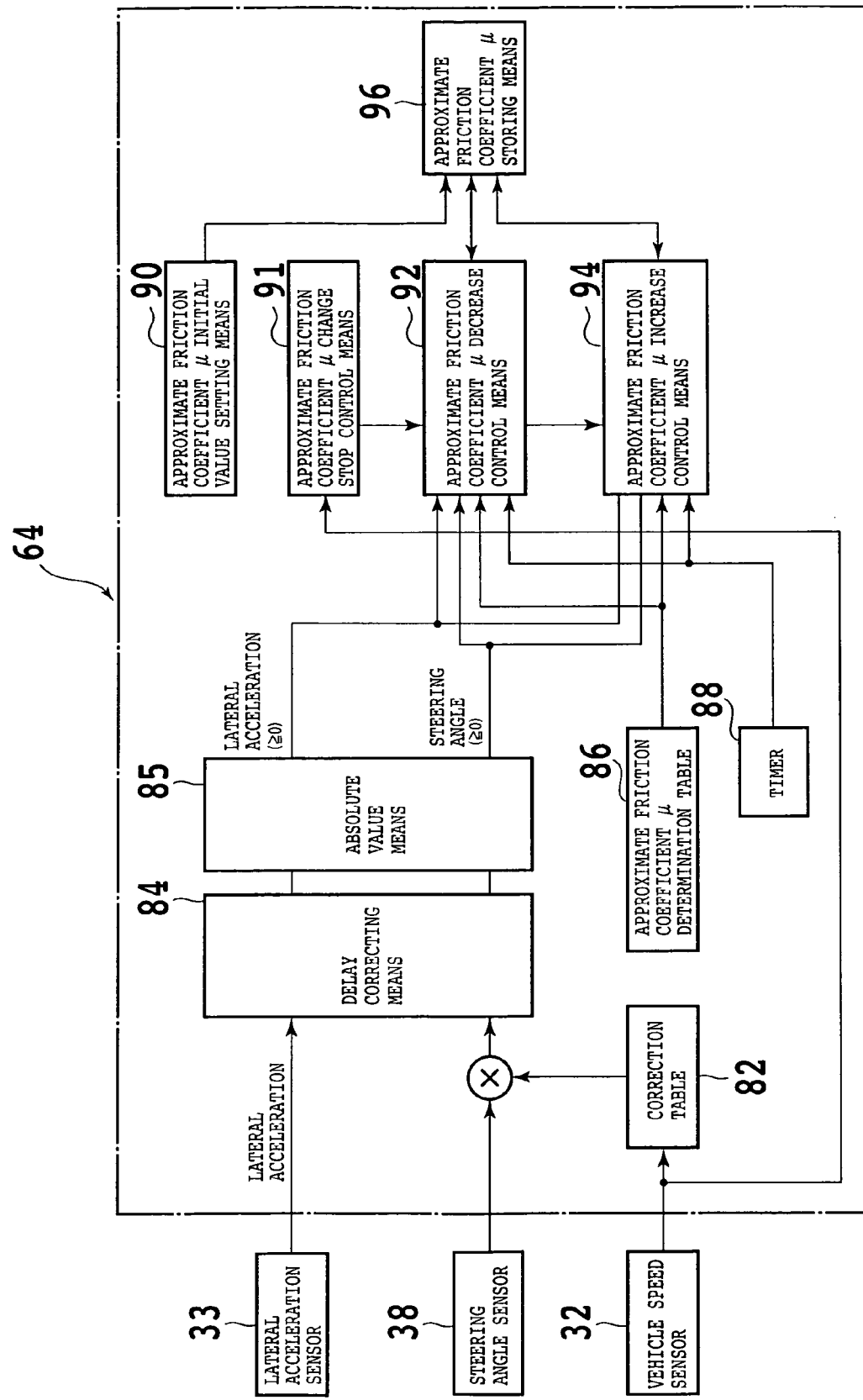
FIG. 4 is a block diagram of an approximate friction coefficient μ estimating section shown in FIG. 3.

FIG. 4 is a block diagram of the approximate friction coefficient μ estimating section 64 shown in FIG. 3. The approximate friction coefficient μ estimating section 64 includes a multiplier 80, correction table 82, delay correcting means 84, absolute value means 85, approximate friction coefficient μ determination table 86, timer 88, approximate friction coefficient μ initial value setting means 90, approximate friction coefficient μ change stop control means 91, approximate friction coefficient μ decrease control means 92, approximate friction coefficient μ increase control means 94, and approximate friction coefficient μ storing means 96.

The multiplier 80 is provided to correct a steering angle detected by the steering angle sensor 38 by obtaining a correction coefficient according to a vehicle speed V with reference to the correction table 82 and multiplying the steering angle by this correction coefficient. The reason for this correction of the steering angle is that the lateral acceleration detected by the lateral acceleration sensor 33 increases with an increase in vehicle speed V even when the steering angle is fixed and that the dependence of the lateral acceleration upon the vehicle speed V is therefore to be removed. For example, the correction coefficient is defined as the ratio of a steering angle $\theta_v$ at a vehicle speed V to a steering angle $\theta_{REF}$ at a reference vehicle speed $V_{REF}$ with a lateral acceleration $G_v$ at the vehicle speed V being fixed.

Figure 5:
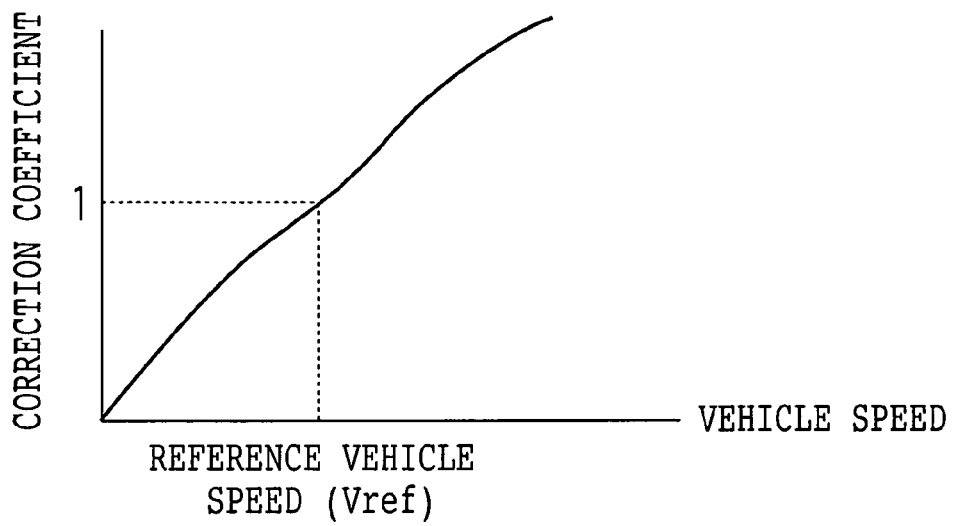
FIG. 5 is a graph showing a correction table shown in FIG. 4.

FIG. 5 is a graph showing the correction table 82. In FIG. 5, the horizontal axis represents vehicle speed and the vertical axis represents correction coefficient. As shown in FIG. 5, the correction coefficient corresponding to the reference vehicle speed $V_{REF}$ is set to 1, and various other values for the correction coefficient corresponding to various other values for the vehicle speed are stored in the correction table 82. The correction coefficient is a monotone increasing function of vehicle speed because the lateral acceleration increases with an increase in vehicle speed even when the steering angle is fixed.

The delay correcting means 84 is provided to make the lateral acceleration detected by the lateral acceleration sensor 33 follow the steering angle detected by the steering angle sensor 38, thereby canceling the delay characteristic between the steering angle and the lateral acceleration. That is, the reason for the provision of the delay correcting means 84 is that the behavior of the vehicle usually slightly delays from the steering operation by the operator even with a maximum road friction coefficient μ and that it is therefore necessary to cancel the delay of the lateral acceleration detected by the lateral acceleration sensor 33 in response to the steering angle detected by the steering angle sensor 38 in the case of rapid steering operation.

Accordingly, as compared with the case that there is no delay of the vehicle behavior, the lateral acceleration detected by the lateral acceleration sensor 33 in the case of rapid steering operation is reduced at the same steering angle. As a result, it is possible to prevent that the approximate friction coefficient μ obtained by using the relation between lateral acceleration and steering angle may become excessively small.

Figure 6:
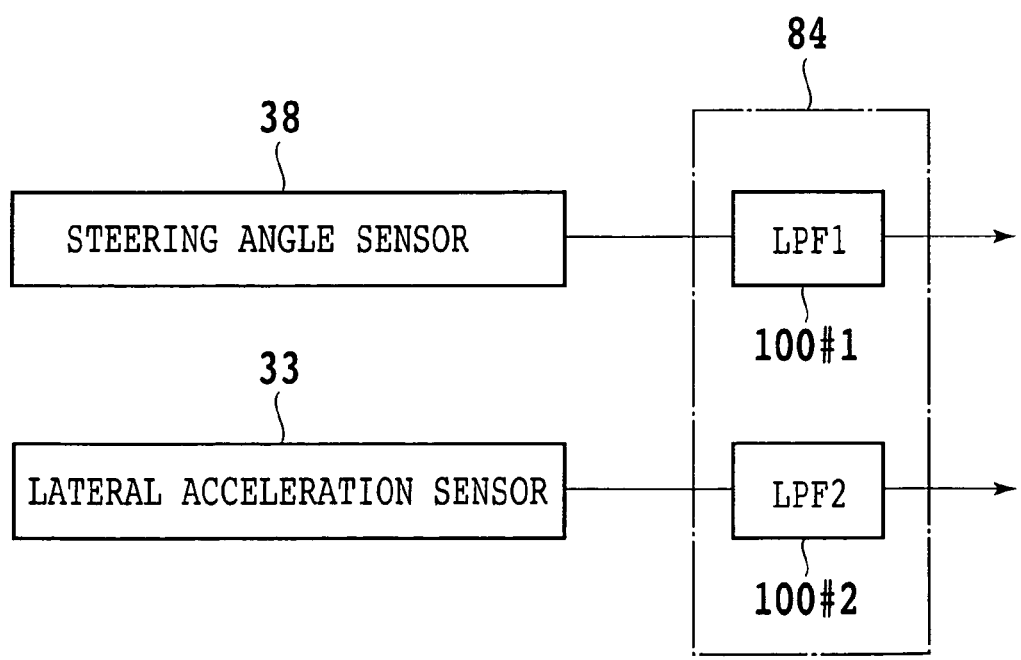
FIG. 6 is a block diagram of delay correcting means shown in FIG. 4.

FIG. 6 is a block diagram showing a preferred embodiment of the delay correcting means 84 shown in FIG. 4. The delay correcting means 84 includes low pass filters 100#1 and 100#2. The low pass filter 100#1 is provided to delay the output from the steering angle sensor 38, and the low pass filter 100#2 is provided to delay the output from the lateral acceleration sensor 33.

Usually, there is a delay characteristic such that the output from the lateral acceleration sensor 33 delays from the output from the steering angle sensor 38. Accordingly, the delay time of the low pass filter 100#1 is set longer than the delay time of the low pass filter 100#2. Further, the cut-off frequency of the low pass filter 100#1 is lower than the cut-off frequency of the low pass filter 100#2, so as to cancel the delay of the lateral acceleration in response to the steering angle. As a modification, the low pass filters 100#1 and 100#2 may be replaced by any other delay elements. The absolute value means 85 generates the absolute values of the lateral acceleration and the steering angle input from the delay correcting means 84.

In the case of plotting the absolute values of running data in a first quadrant (positive values for the steering angle and the lateral acceleration) with the horizontal axis and the vertical axis representing the steering angle and the lateral acceleration, respectively, a boundary line between different road friction coefficients μ is derived from lower limits of the lateral acceleration over various values of the steering angle. This boundary line is unique to each road friction coefficient μ, and shifts upward with an increase in value of the road friction coefficient μ.

The approximate friction coefficient μ determination table 86 is a table where a plurality of regions A1 to An (n is an integer not less than 2) each composed of steering angle and lateral acceleration are defined so as to respectively correspond to a plurality of road friction coefficients μi (i=1 to n, n is an integer not less than 2, μi>μ(i+1) and μi−μ(i+1)=S where i=1 to n−1 and S is a constant step), at a reference vehicle speed $V_{REF}$, in which the above-mentioned boundary line is formed between μi and μ(i+1).

Figure 7:
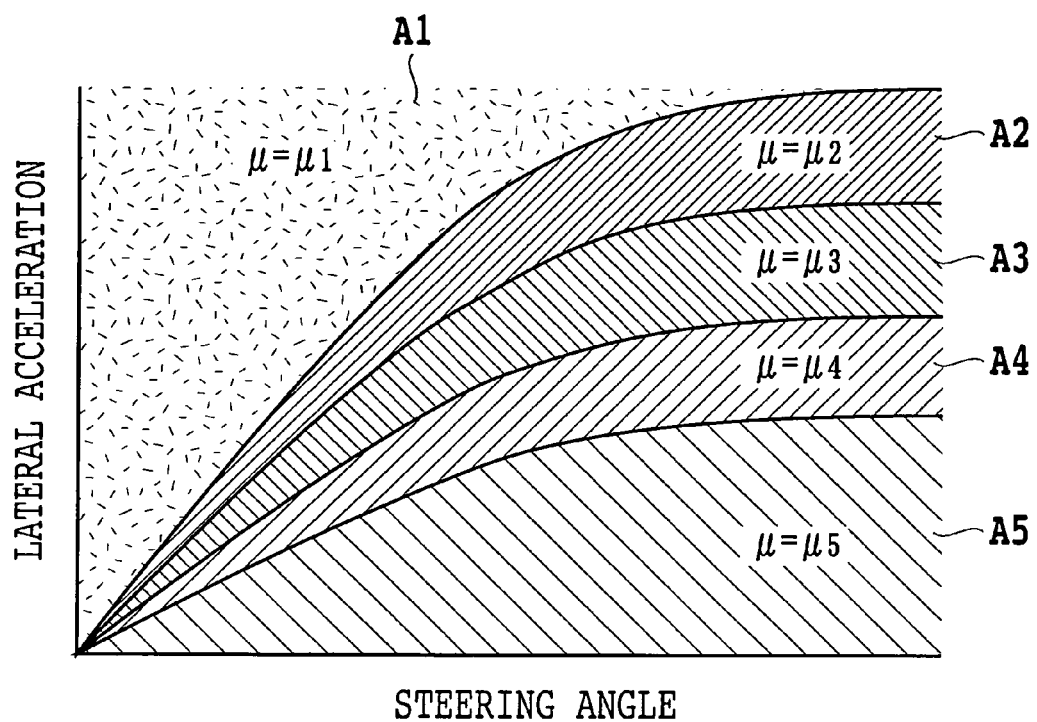
FIG. 7 is a graph showing an approximate friction coefficient μ determination table shown in FIG. 4.

FIG. 7 is a graph showing an example of the approximate friction coefficient μ determination table 86. In this example, the approximate friction coefficient μ determination table 86 is a table where a plurality of regions A1 to A5 as differently hatched are defined so as to respectively correspond to a plurality of road friction coefficients μ1 to μ5. Further, μ1>μ2>μ3>μ4>μ5, and the constant step S is expressed as S=μi−μ(i+1) (i=1 to 4).

In the regions A1 to A5, the boundary line between the regions Ai and A(i+1) (i=1 to 4) is the same as the above-mentioned boundary line between μi and μ (i+1). Accordingly, in a region Aj (j>i), the combination of steering angle and lateral acceleration relating to the road friction coefficient μ (μi≦μ) is absent, and it is estimated that the road friction coefficient μ in the region Aj (j>i) is smaller than μi. In other words, it is estimated that the road friction coefficient μ in the region A(i+1) is less than or equal to μi.

For example, in the case that μ1=1.0, μ2=0.8, μ3=0.6, μ4=0.4, μ5=0.2, and S=0.2, it is estimated that μ≦1.0 in the region A2, μ≦0.8 in the region A3, μ≦0.6 in the region A4, and μ≦0.4 in the region A5. Thus, it is estimated that the road friction coefficient μ in the region Ai (i=2 to 5) is in the range of μ≦μi+0.2.

In the region Ai (i=1 to 4), a road friction coefficient μ smaller than (μi−S) may be included in the relation between steering angle and lateral acceleration. As will be hereinafter described, the friction coefficient μ fine adjusting value to be computed by the friction coefficient μ fine adjusting section 66 has an upper limit of S and a lower limit of −S, thereby improving the accuracy of estimation. Accordingly, the lower limit of the range of estimation of the road friction coefficient μ in the region Ai (i=1 to 4) is set to (μi−S). The road friction coefficient μ smaller than μi−S included in the region Ai is estimated in the region Aj (j>i). The range of estimation of the road friction coefficient μ in the region Ai (i=2 to 5) is expressed as μi−S≦μ≦μi+S.

The timer 88 shown in FIG. 4 is provided to determine whether or not the approximate friction coefficient μ stays for more than a predetermined time in the region where it is smaller than the present estimated value of the approximate friction coefficient μ or to determine whether or not a straight running condition is detected for more than a predetermined time. The reason for the provision of the timer 88 is to prevent improper determination due to a sensor error.

The approximate friction coefficient μ initial value setting means 90 is provided to set an initial value of the approximate friction coefficient μ, e.g., a dry road friction coefficient μ (μ=1) when an ignition switch is turned on.

The approximate friction coefficient μ change stop control means 91 is provided to stop the change of the approximate friction coefficient μ when the vehicle speed detected by the vehicle speed sensor 32 is not greater than a predetermined value. For example, when the steering wheel is turned in the stop condition of the vehicle, the output from the lateral acceleration sensor 33 remains zero. Accordingly, unless the estimation of the approximate friction coefficient μ is stopped, the estimated value of the approximate friction coefficient μ decreases to a minimum value. To avoid this problem, the estimation at a low vehicle speed is stopped. Further, this processing is allowed because any problem on the vehicle behavior due to a reduction in road friction coefficient μ at a low vehicle speed is not so large as compared with that at a medium vehicle speed or higher. The above predetermined value is set to about 10 km/h, for example.

The approximate friction coefficient μ decrease control means 92 is provided to decrease the approximate friction coefficient μ by one step and to set the decreased approximate friction coefficient μ when the approximate friction coefficient μ stays for more than a predetermined time in the region where it is smaller than the present estimated value of the approximate friction coefficient μ. In the case that the approximate friction coefficient μ stays in the region where it is smaller than the present estimated value of the approximate friction coefficient μ, the friction coefficient μ on the road where the vehicle is running is not greater than the upper limit of the friction coefficient μ in this region. Accordingly, the approximate friction coefficient μ is decreased by one step to reduce the lower limit of the range of estimation of the friction coefficient μ after fine adjustment.

The approximate friction coefficient μ increase control means 94 is provided to increase the approximate friction coefficient μ by one step and to set the increased approximate friction coefficient μ when the straight running condition of the vehicle is detected for more than a predetermined time or when the approximate friction coefficient μ is smaller than the output from the lateral acceleration sensor 33. In the straight running condition, there is no remarkable difference in the relation between lateral acceleration and steering angle according to a difference in the road friction coefficient μ. Accordingly, the estimation of the road friction coefficient μ in the straight running condition is difficult. Further, the approximate friction coefficient μ tends to be decreased by the approximate friction coefficient μ decrease control means 92, and there is a possibility that the approximate friction coefficient μ may be estimated to an excessively small value. To prevent such estimation of the friction coefficient μ to an excessively small value, the approximate friction coefficient μ is increased in the straight running condition.

The straight running condition is detected when the lateral acceleration detected by the lateral acceleration sensor 33 is near zero, when the yaw rate detected by the yaw rate sensor 34 is near zero, or when both the lateral acceleration and the yaw rate are near zero.

Further, there is usually no possibility of generation of a lateral acceleration larger than the road friction coefficient μ. If the lateral acceleration detected is larger than the road friction coefficient μ, it is considered that the estimated value of the road friction coefficient μ is excessively small. Accordingly, to avoid this estimation of the friction coefficient μ to an excessively small value, the approximate friction coefficient μ is increased by one step. In the case that the road friction coefficient μ stays for more than the above predetermined time in the region where it is greater than the present estimated value of the approximate friction coefficient μ, the approximate friction coefficient μ is not increased by one step for the following reason.

In the case that the vehicle is running stably at a constant speed, there is no remarkable difference in the relation between steering angle and lateral acceleration according to a difference in the road friction coefficient μ in general vehicle characteristics. That is, the vehicle may possibly run in the region where the approximate friction coefficient μ is larger than an actual road friction coefficient μ. Accordingly, if the approximate friction coefficient μ is increased in the region where the approximate friction coefficient μ is larger than the present estimated value, there is a possibility that the approximate friction coefficient μ may be estimated to an excessively large value. The approximate friction coefficient μ storing means 96 is a memory for storing the approximate friction coefficient μ.

Figure 8:
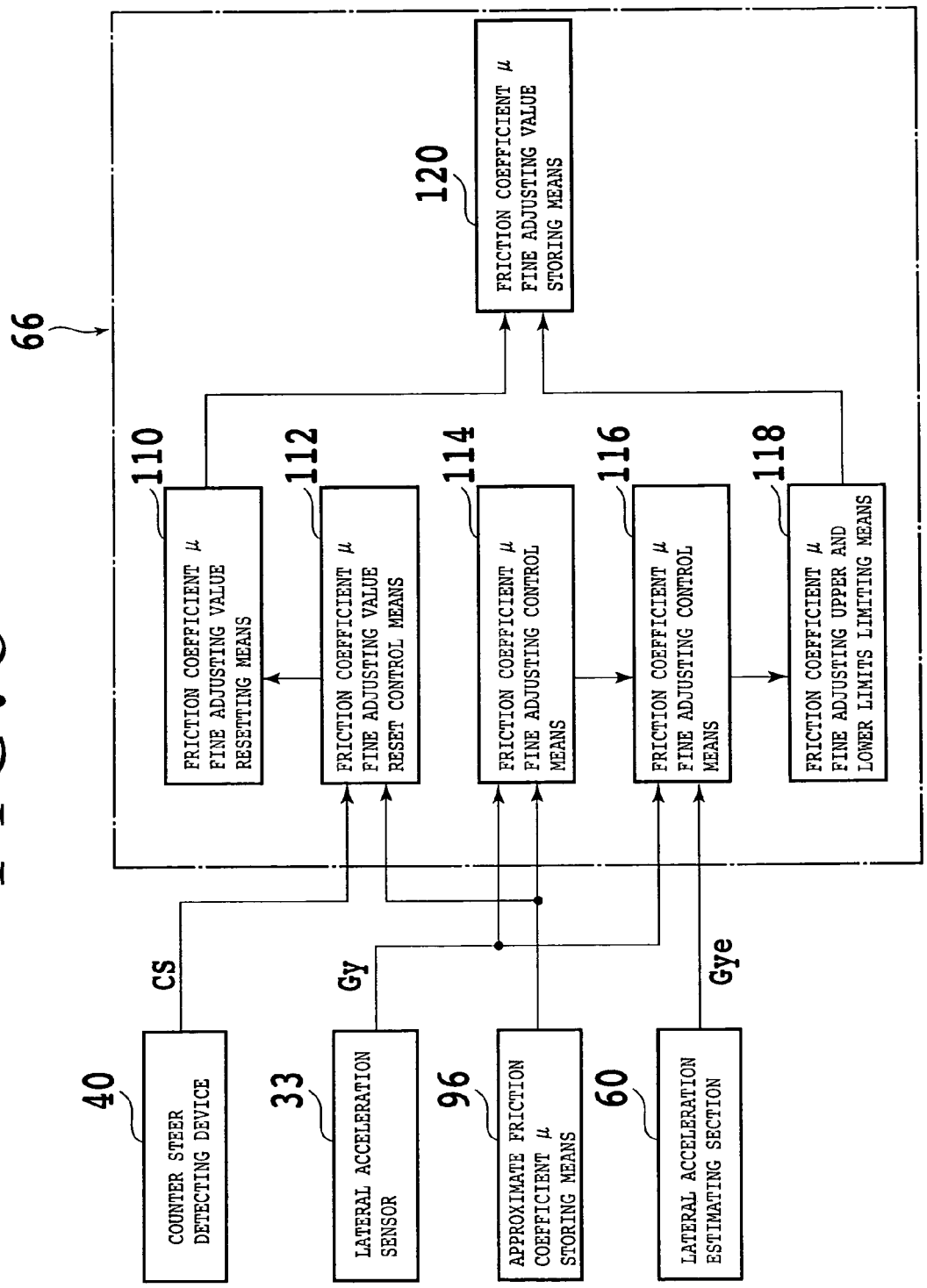
FIG. 8 is a block diagram of a friction coefficient μ fine adjusting section shown in FIG. 3.

FIG. 8 is a block diagram of the friction coefficient μ fine adjusting section 66 shown in FIG. 3. The friction coefficient μ fine adjusting section 66 is provided to adjust the road friction coefficient μ in a given range on the basis of the approximate friction coefficient μ stored in the approximate friction coefficient μ storing means 96, thereby estimating the road friction coefficient μ. The friction coefficient μ fine adjusting section 66 includes friction coefficient μ fine adjusting value resetting means 110, friction coefficient μ fine adjusting value reset control means 112, friction coefficient μ fine adjustment control means 114, friction coefficient μ fine adjusting means 116, friction coefficient μ fine adjusting value upper and lower limits limiting means 118, and friction coefficient μ fine adjusting value storing means 120.

The friction coefficient μ fine adjusting value resetting means 110 is provided to reset a friction coefficient μ fine adjusting value to zero according to the instruction from the friction coefficient μ fine adjusting value reset control means 112. The friction coefficient μ fine adjusting value reset control means 112 is provided to instruct the friction coefficient μ fine adjusting value resetting means 110 to reset the friction coefficient μ fine adjusting value to zero when the approximate friction coefficient μ stored in the approximate friction coefficient μ storing means 96 varies. The friction coefficient μ fine adjusting value varies with variations in the approximate friction coefficient μ. Accordingly, by resetting the friction coefficient μ fine adjusting value according to variations in the approximate friction coefficient μ, the estimation accuracy in the case of variations in the approximate friction coefficient μ can be improved.

The friction coefficient μ fine adjustment control means 114 is provided to instruct the friction coefficient μ fine adjusting means 116 to stop the fine adjustment when K(K is a constant) times the approximate friction coefficient μ stored in the approximate friction coefficient μ storing means 96 is greater than or equal to the lateral acceleration detected by the lateral acceleration sensor 33 or when the counter steer is detected as indicated by the counter steer flag CS output from the counter steer detecting device 40.

When the approximate friction coefficient µ multiplied by K is greater than or equal to the lateral acceleration detected by the lateral acceleration sensor 33, it is considered that the tires are running in a linear region. Accordingly, the effect by the friction coefficient µ fine adjustment is small in this case, so that the friction coefficient µ fine adjustment is stopped to thereby prevent a reduction in estimation accuracy. On the other hand, when the counter steer is detected, the accuracy of the lateral acceleration detected by the lateral acceleration sensor 33 is greatly reduced and the friction coefficient µ fine adjustment cannot therefore be expected. Accordingly, the friction coefficient µ fine adjustment is stopped also in this case to thereby prevent a reduction in estimation accuracy.

The friction coefficient µ fine adjusting means 116 is provided to perform proportional-integral-derivative (PID) action on the basis of the approximate friction coefficient µ stored in the approximate friction coefficient µ storing means 96 and to calculate the fine adjusting value for finely adjusting the estimated road friction coefficient µ so that the difference between the detected lateral acceleration $G_y$ and the estimated lateral acceleration $G_{ye}$ becomes zero.

The friction coefficient µ fine adjusting value upper and lower limits limiting means 118 is provided to limit the upper and lower limits of the fine adjusting value calculated by the friction coefficient µ fine adjusting means 116 to the step S relating to the road friction coefficients µ1 to µn defined in the approximate friction coefficient µ determination table 86, then outputting the friction coefficient µ fine adjusting value limited above to the friction coefficient µ fine adjusting value storing means 120. The absolute value of each of the upper and lower limits to be limited may be greater than the step S. The friction coefficient µ fine adjusting value storing means 120 is a memory for storing the friction coefficient µ fine adjusting value, and outputs it to the adder 68.

The adder 68 shown in FIG. 3 is provided to add the friction coefficient µ fine adjusting value input from the friction coefficient µ fine adjusting section 66 and the approximate friction coefficient µ input from the approximate friction coefficient µ estimating section 64 and to output the result of this addition, µ as the estimated road friction coefficient µ to the tire lateral force computing section 70.

The tire lateral force computing section 70 calculates a tire lateral force $Y_r$ according to Eq. (3) or (4) derived from a tire dynamic model, and outputs the tire lateral force $Y_r$ to the slip angle derivative computing section 72.

$$Y_r = \left(\mu K \beta - \frac{\mu^2 K^2}{4\mu W}\beta^2\right)\sqrt{1-\left(\frac{X}{\mu W}\right)^2}, \text{ when } |\beta| < \frac{2W}{K} \quad (3)$$

$$Y_r = \mu W \sqrt{1-\left(\frac{X}{\mu W}\right)^2}, \text{ when } |\beta| > \frac{2W}{K} \quad (4)$$

However, in Eq. (3) and (4), where W is the vertical load, e.g., a measured value of the vehicle load corrected by using longitudinal and lateral accelerations or a value obtained from an output from a load cell provided at a suspension, K is the cornering power, e.g., a value obtained from a predetermined map, e.g., a map of cornering power changing according to the road friction coefficient µ and the vertical load W, X is the longitudinal force, e.g., a value estimated from an acceleration or obtained from a brake fluid pressure or an engine output, β is the previous estimated slip angle, and µ is the estimated road friction coefficient µ, which is output from the adder 68.

The slip angle derivative computing section 72 calculates a slip angle derivative β' from Eq. (7) obtained by using Eqs. (5) and (6) describing the balance between forces in the lateral direction of the vehicle and the balance between moments about the vertical axis of the vehicle on the basis of a lateral force $Y_f$ acting on each front tire and a lateral force $Y_r$ acting on each rear tire and by eliminating the lateral force Yf from Eqs. (5) and (6).

$$mV(r+\beta')=-2Y_f-2Y_r \quad (5)$$

$$Ir'=-2Y_fL_f+2Y_rL_r+M \quad (6)$$

$$\beta'=-2(L_f+L_r)Y_r/mVL_f+Ir'/mVL_f-r-M/mVL_f \quad (7)$$

where $L_f$ is the distance from the center of gravity of the vehicle to the front axle, $L_r$ is the distance from the center of gravity of the vehicle to the rear axle, $Y_r$ is the tire lateral force, r' is the yaw rate derivative, m is the total mass of the vehicle, I is the yawing moment of inertia, and M is the yawing moment.

The slip angle derivative divergence preventing section 74 prevents the divergence of the slip angle derivative β' output from the slip angle derivative computing section 72. More specifically, when the vehicle speed V is less than or equal to a predetermined speed, the slip angle derivative β' is forcibly reset to zero, and then output to the integrator 76 and the lateral acceleration estimating section 60. On the other hand, when the vehicle speed V is greater than the predetermined speed, the slip angle derivative β' input from the slip angle derivative computing section 72 is output as it is to the integrator 76 and the lateral acceleration estimating section 60.

In controlling a motional condition of the vehicle such as a turning motion, the slip angle of the vehicle is used mainly for the purpose of detecting an unstable behavior during running. It is therefore important to ensure the accuracy of estimation of the slip angle at a certain vehicle speed or higher where there is a possibility that the behavior of the vehicle may become unstable.

By resetting the slip angle to zero to prevent the divergence of the slip angle at a low vehicle speed where the influence of instability of the behavior is small, a reduction in estimation accuracy can be made tolerable as compared with the case of slip angle divergence.

The slip angle β as a characteristic of the vehicle can be theoretically calculated from Eq. (8) shown below.

$$\beta = \frac{1-\dfrac{mL_fV^2}{2LL_rK_r}}{1-\dfrac{m}{2L^2}\dfrac{(L_fK_f-L_rK_r)V^2}{K_fK_r}}\dfrac{L_r}{L}\delta_0 \quad (8)$$

where β is the slip angle, m is the mass of the vehicle, L is the wheel base, $L_f$ is the distance from the center of gravity of the vehicle to the front axle, $L_r$ is the distance from the center of gravity of the vehicle to the rear axle, V is the vehicle speed, $K_f$ is the cornering power on each front wheel, $K_r$ is the cornering power on each rear wheel, and $\delta_0$ is the actual steering angle.

Eq. (8) shows that the vehicle speed important in performing the vehicle control is a vehicle speed corresponding to a slip angle β less than or equal to zero. A vehicle speed $V_0$ corresponding to a slip angle β equal to zero is given by Eq. (9) shown below.

$$V_0 = \sqrt{\frac{2LL_rK_r}{mL_f}} \quad (9)$$

As apparent from Eq. (9), the vehicle speed $V_0$ is obtained from the constants inherent in the vehicle and $K_r$. $K_r$ becomes small when the road friction coefficient is small. Accordingly, when the road surface is a slippery road surface such as a snowy road surface, the vehicle speed $V_0$ becomes small.

Since the road friction coefficient on a snowy road or the like is the lowest coefficient of friction on a road where the vehicle runs, the vehicle speed $V_0$ corresponding to this road friction coefficient may be defined as a speed range used in accurately estimating the slip angle β. The above-mentioned predetermined speed is set to the vehicle speed $V_0$ calculated above. For example, this predetermined speed is generally set to 5 to 10 km/h or less, depending upon the characteristics of the vehicle.

The integrator 76 integrates the slip angle derivative β' input from the slip angle derivative divergence preventing section 74 with respect to time, and then outputs the integral β to the slip angle divergence preventing section 78. The slip angle divergence preventing section 78 prevents the divergence of the slip angle β output from the integrator 76. More specifically, when the vehicle speed V is less than or equal to the above predetermined speed, the slip angle β is forcibly reset to zero, and then output to the tire lateral force computing section 70. On the other hand, when the vehicle speed V is greater than the above predetermined speed, the slip angle β input from the integrator 76 is output as it is to the tire lateral force computing section 70.

Thus, the estimated value of the slip angle derivative β' and the estimated value of the slip angle β are forcibly reset to zero when the vehicle speed is less than or equal to the predetermined speed. As a result, the divergence of the slip angle derivative β' and the slip angle β due to the approach of the vehicle speed toward zero can be prevented as apparent from Eq. (1). Furthermore, unnecessary estimation at the predetermined vehicle speed or less can be eliminated, so that the torque control output from the target distributed torque control device 44 can be stabilized.

Figure 9:
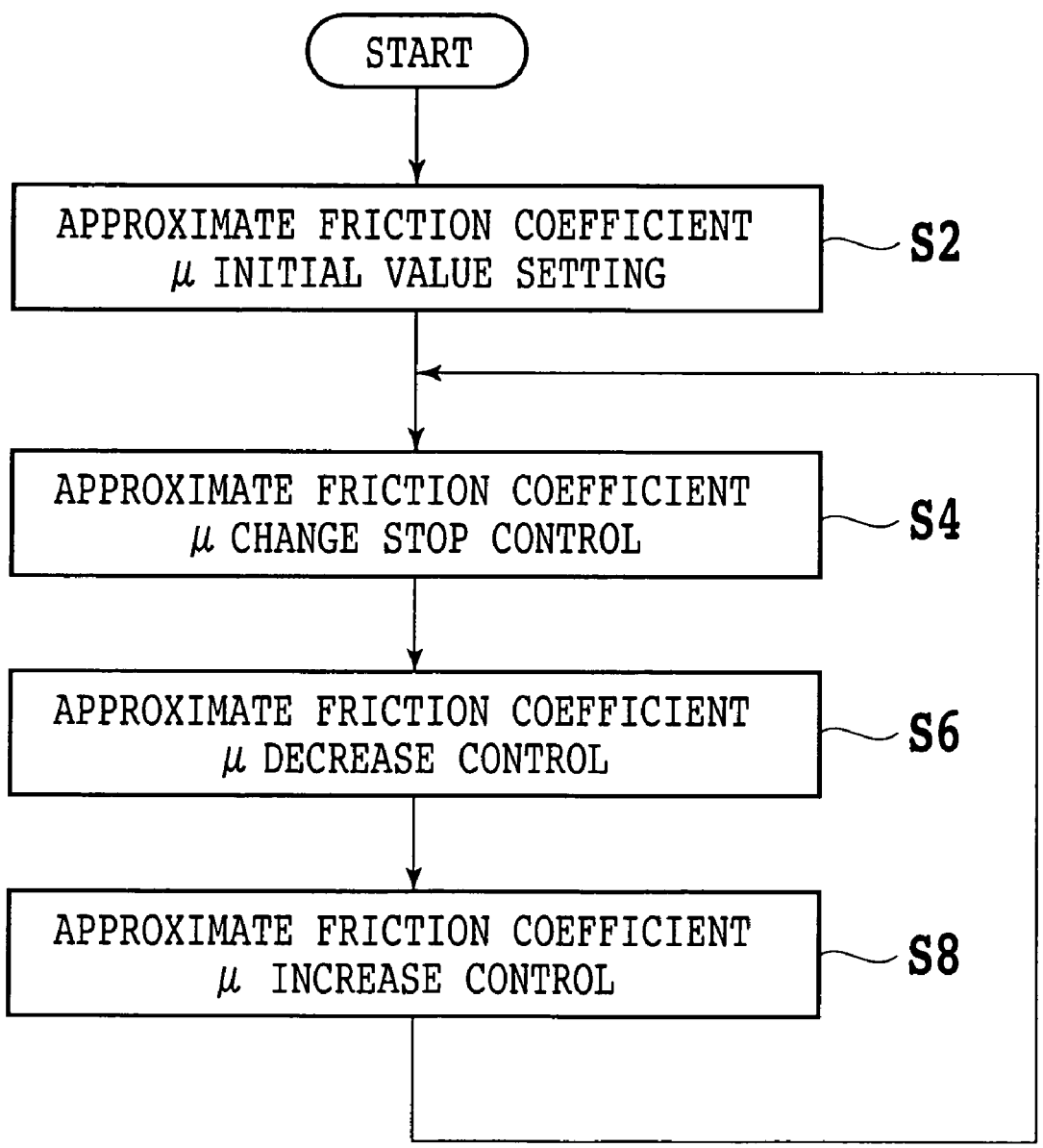
FIG. 9 is a flowchart showing an approximate friction coefficient μ estimating method.

FIG. 9 is a flowchart showing the approximate friction coefficient μ estimating method according to the preferred embodiment of the present invention. In step S2, when the ignition switch is turned on, the initial value of the approximate friction coefficient μ, e.g., a dry road friction coefficient (μ=1), is set in the approximate friction coefficient μ storing means 96. In step S4, the following approximate friction coefficient μ change stop control is performed.

Figure 10:
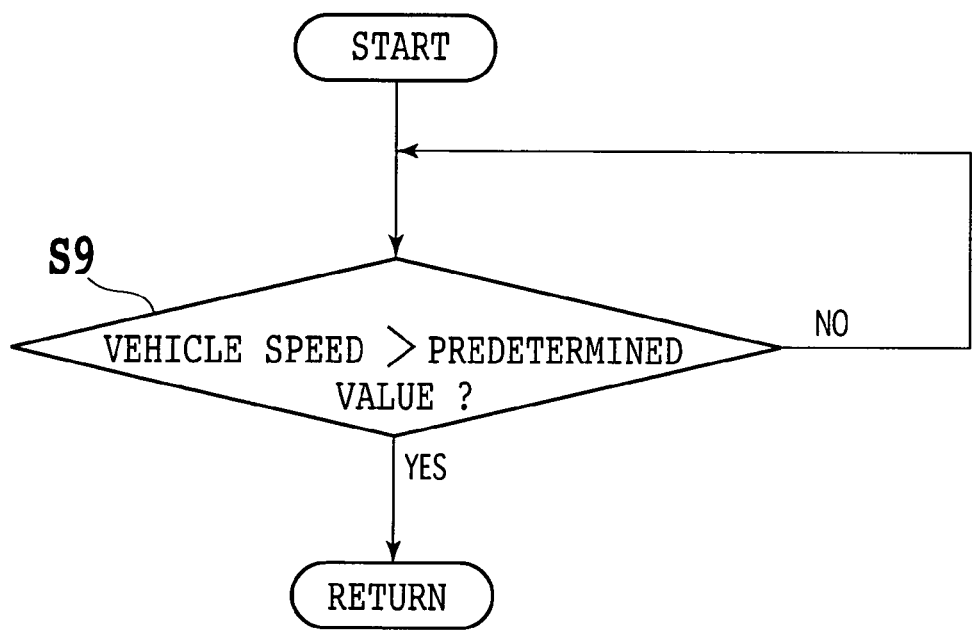
FIG. 10 is a flowchart showing approximate friction coefficient μ change stop control.

FIG. 10 is a flowchart showing the approximate friction coefficient μ change stop control. In step S9, the approximate friction coefficient μ change stop control means 91 determines whether or not the vehicle speed detected by the vehicle speed sensor 32 is greater than a predetermined value. If the vehicle speed is greater than the predetermined value, the program returns to step S6 shown in FIG. 9, whereas if the vehicle speed is less than or equal to the predetermined value, the program returns to step S9. In step S6 shown in FIG. 9, the following approximate friction coefficient μ decrease control is performed.

Figure 11:
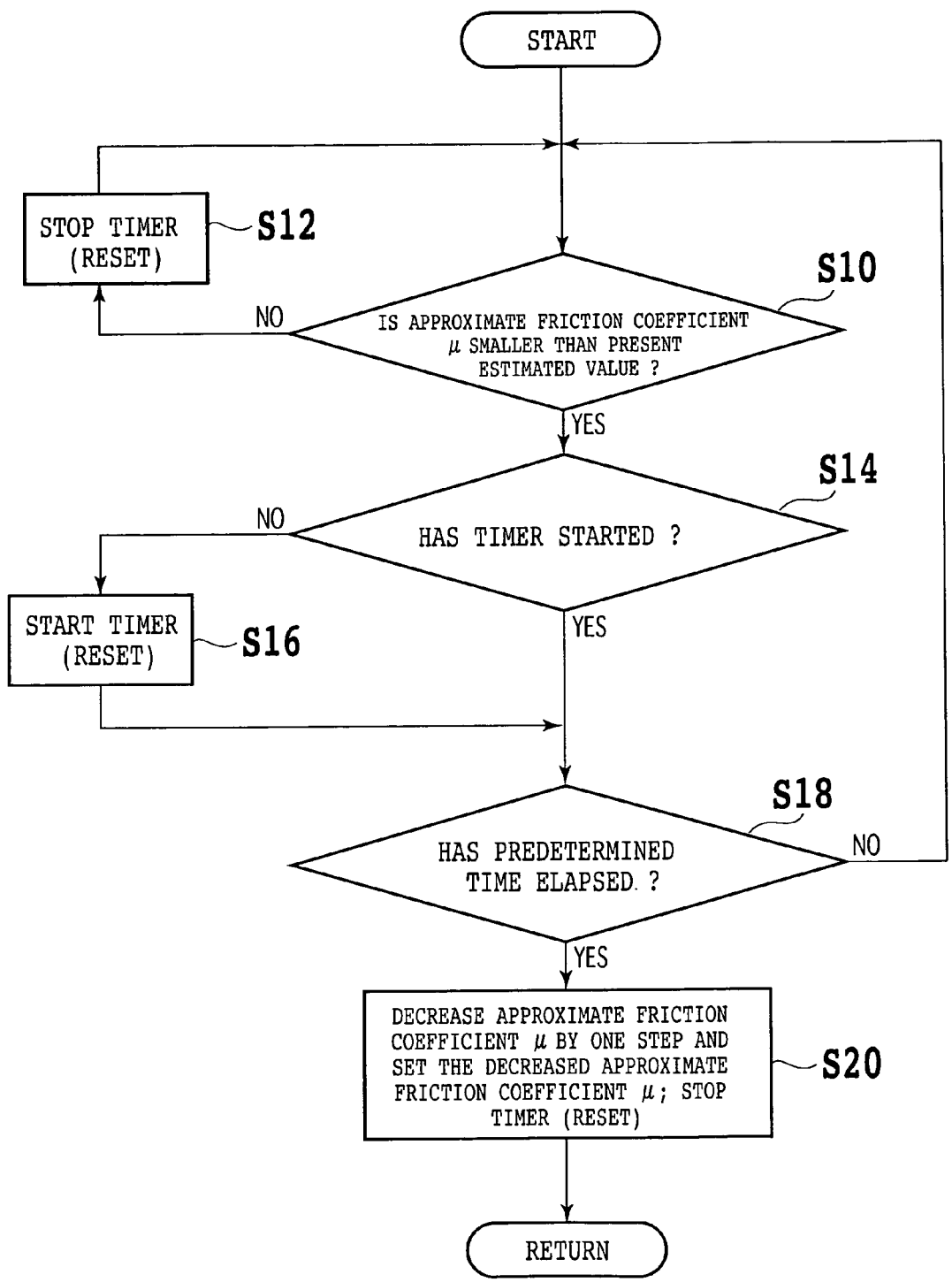
FIG. 11 is a flowchart showing approximate friction coefficient μ decrease control.
Figure 12:
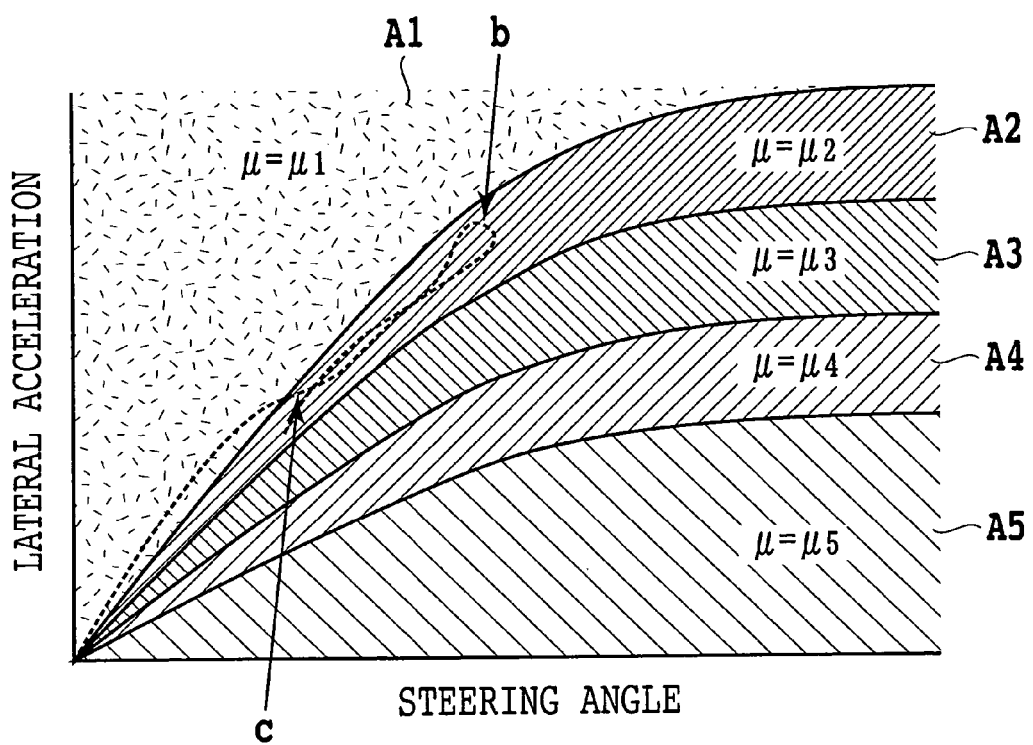
FIG. 12 is a graph showing the approximate friction coefficient μ decrease control in relation to running data.

FIG. 11 is a flowchart showing the approximate friction coefficient μ decrease control. FIG. 12 is a graph showing the approximate friction coefficient μ decrease control in relation to running data. The steering angle detected by the steering angle sensor 38 is corrected by the multiplier 80, and the delay of the lateral acceleration detected by the lateral acceleration sensor 33 from the steering angle is canceled by the delay correcting means 84. The absolute values of the steering angle and the lateral acceleration output from the delay correcting means 84 are given by the absolute value means 85.

In step S10, the approximate friction coefficient μ decrease control means 92 refers to the approximate friction coefficient μ determination table 86 in relation to the steering angle and the lateral acceleration input from the absolute value means 85 to obtain the approximate friction coefficient μi corresponding to the region Ai where the combination of the steering angle and the lateral acceleration is present. Then, the approximate friction coefficient μ decrease control means 92 determines whether or not the approximate friction coefficient μi obtained above is less than the present estimated value of the approximate friction coefficient μ stored in the approximate friction coefficient μ storing means 96.

If the approximate friction coefficient μi obtained above is less than the present estimated value of the approximate friction coefficient μ, the program proceeds to step S14, whereas if the approximate friction coefficient μi obtained above is not less than the present estimated value of the approximate friction μ coefficient, the program proceeds to step S12. In step S12, the timer 88 is stopped (reset), and the program returns to step S10.

In step S14, it is determined whether or not the timer 88 has started. If the timer 88 has not started, the program proceeds to step S16 to start (reset) the timer 88.

If the timer 88 has started, the program proceeds to step S18 to determine whether or not a predetermined time has elapsed. If the predetermined time has elapsed, the program proceeds to step S20, whereas if the predetermined time has not elapsed, the program returns to step S10. In step S20, the approximate friction μ coefficient is decreased by one step and set in the approximate friction coefficient μ storing means 96. Then, the timer 88 is stopped (reset), and the program returns to step S8 shown in FIG. 9.

Referring to FIG. 12, reference symbol b designates an example of the running data as the combination of steering angle and lateral acceleration. This running data designated by the symbol b shows that the approximate friction coefficient μ has varied from β1 in the region A1 to μ2 in the region A2 (μ1<μ2) and that the approximate friction coefficient μ2 remains for more than the predetermined time. At a point shown by reference symbol c, the elapse of more than the predetermined time in the region A2 is determined, and the approximate friction coefficient μ to be stored is decreased from μ1 to μ2. In step S8 shown in FIG. 9, the following approximate friction coefficient μ increase control is performed.

Figure 13:
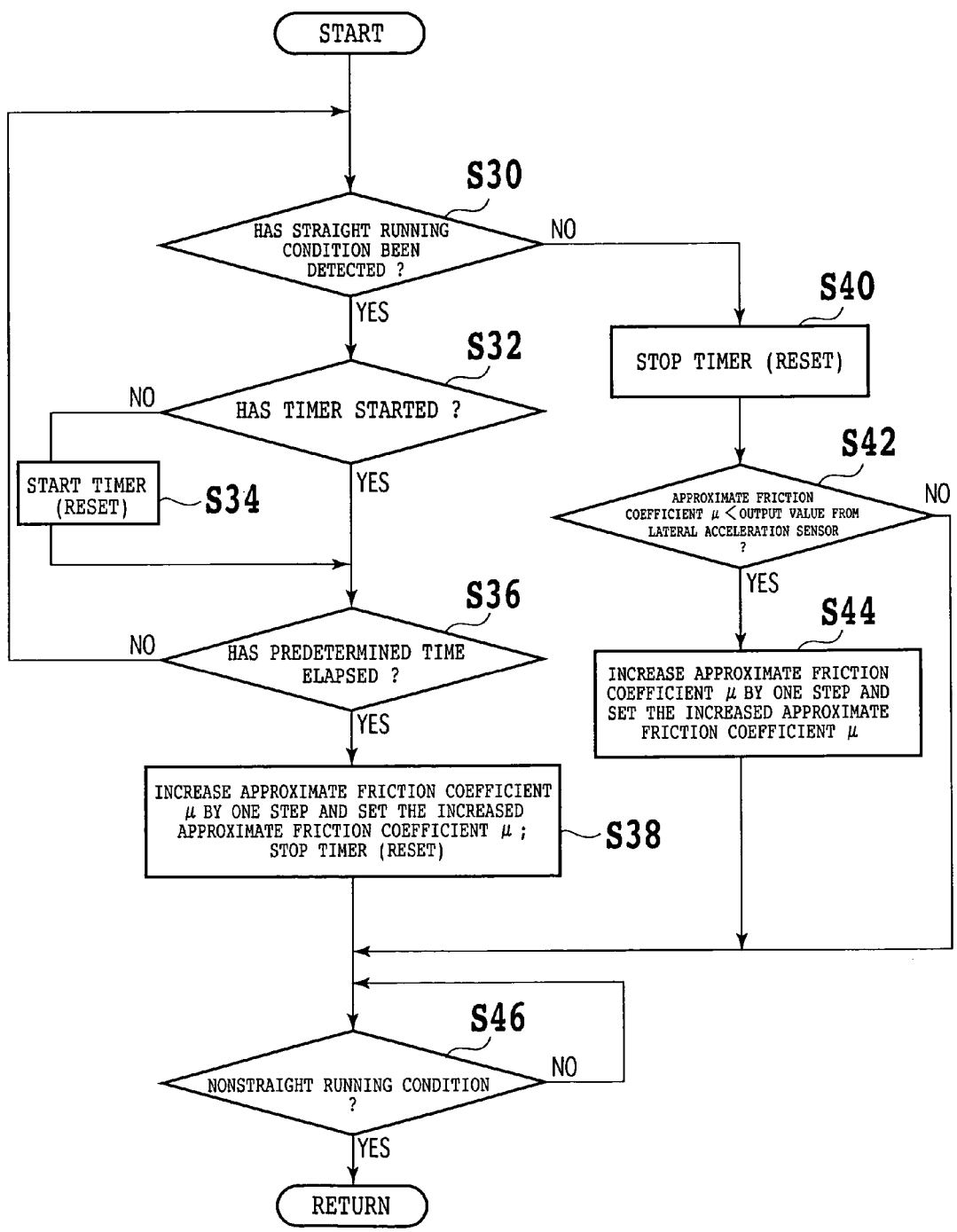
FIG. 13 is a flowchart showing approximate friction coefficient μ increase control.

FIG. 13 is a flowchart showing the approximate friction coefficient μ increase control. In step S30, the approximate friction coefficient μ increase control means 94 determines whether or not the straight running condition has been detected according to the lateral acceleration, the yaw rate, or both the lateral acceleration and the yaw rate. If the straight running condition has been detected, the program proceeds to step S32 to determine whether or not the timer 88 has started.

If the timer 88 has not started, the program proceeds to step S34 to start (reset) the timer 88 and then proceeds to step S36. If the timer 88 has started in step S32, the program proceeds to step S36. In step S36, it is determined whether or not a predetermined time has elapsed.

If the predetermined time has not elapsed, the program returns to step S30, whereas if the predetermined time has elapsed, the program proceeds to step S38. In step S38, the approximate friction coefficient μ is increased by one step and set in the approximate friction coefficient μ storing means 96. Then, the timer 88 is stopped (reset), and the program proceeds to step S46.

If the straight running condition has not been detected in step S30, the program proceeds to step S40 to stop (reset) the timer 88. In step S42, it is determined whether or not the approximate friction coefficient μ is less than the lateral acceleration detected by the lateral acceleration sensor 33. If the approximate friction coefficient μ is less than the lateral acceleration detected by the lateral acceleration sensor 33, the program proceeds to step S44, whereas if the approximate friction coefficient μ is not less than the lateral acceleration detected by the lateral acceleration sensor 33, the program proceeds to step S46. In step S44, the approximate friction coefficient μ is increased by one step and set in the approximate friction coefficient μ storing means 96. Then, the program proceeds to step S46.

In step S46, it is determined whether or not the vehicle is in a nonstraight running condition. If the vehicle is in the nonstraight running condition, the program returns to step S4 shown in FIG. 9. If the vehicle is in the straight running condition, the program returns to step S46. Accordingly, after the approximate friction coefficient μ is increased by one step in the straight running condition, increasing the approximate friction coefficient is stopped until the nonstraight running condition μ is detected. As a result, it is possible to prevent that the approximate friction coefficient μ may become excessively large because of long-time continuation of the straight running condition.

Figure 14:
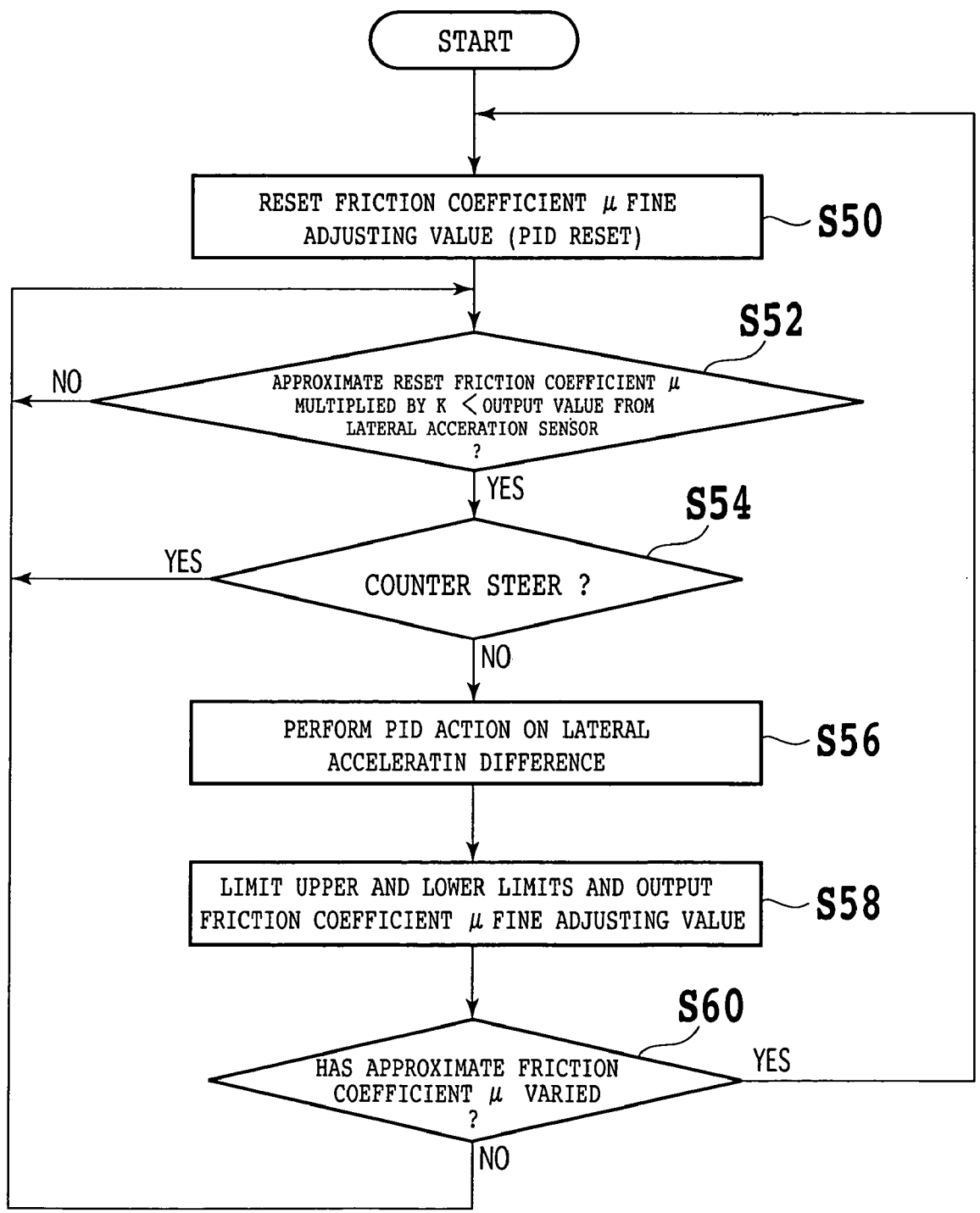
FIG. 14 is a flowchart showing a friction coefficient μ fine adjusting method.

FIG. 14 is a flowchart showing the friction coefficient μ fine adjusting method according to the preferred embodiment of the present invention. In step S50, the friction coefficient μ fine adjusting value resetting means 110 resets the fine adjusting value for the friction coefficient μ (PID reset) and inputs the reset value into the friction coefficient μ fine adjusting value storing means 120. In step S52, the friction coefficient μ fine adjustment means 116 determines whether or not the approximate friction coefficient μ multiplied by K is less than the lateral acceleration detected by the lateral acceleration sensor 33. If the approximate friction coefficient μ multiplied by K is not less than the lateral acceleration detected by the lateral acceleration sensor 33, the program returns to step S52, whereas if the approximate friction coefficient μ multiplied by K is less than the lateral acceleration detected by the lateral acceleration sensor 33, the program proceeds to step S54.

In step S54, the friction coefficient μ fine adjustment control means 114 determines whether or not counter steer is detected according to the counter steer flag CS. If the counter steer is detected, the program returns to step S52, whereas if the counter steer is not detected, the friction coefficient μ fine adjustment control means 114 instructs the friction coefficient μ fine adjusting means 116 to finely adjust the friction coefficient μ, and the program proceeds to step S56.

In step S56, the friction coefficient μ fine adjusting means 116 performs proportional-integral-derivative (PID) action on the basis of the approximate friction coefficient μ stored in the approximate friction coefficient μ storing means 96 to calculate the friction coefficient μ fine adjusting value for finely adjusting the estimated road friction coefficient μ so that the difference between the detected lateral acceleration $G_y$ and the estimated lateral acceleration $G_{ye}$ becomes zero.

In step S58, the friction coefficient μ fine adjusting value upper and lower limits limiting means 118 limits the upper and lower limits of the friction coefficient μ fine adjusting value calculated in step S56 so that the upper and lower limits become +S and −S, respectively, and then outputs the friction coefficient μ fine adjusting value limited above to the friction coefficient μ fine adjusting value storing means 120.

In step S60, the friction coefficient μ fine adjusting value reset control means 112 determines whether or not the approximate friction coefficient μ stored in the approximate friction coefficient μ storing means 96 has varied. If the approximate friction coefficient μ has varied, the control means 112 instructs the resetting means 110 to reset the friction coefficient μ fine adjusting value to zero, and the program returns to step S50. In step S50, the resetting means 110 resets the friction coefficient μ fine adjusting value to zero and then outputs the reset value to the storing means 120. If the approximate friction coefficient μ has not varied, the program returns to step S52. The above steps S50 to S60 are repeated to thereby improve the accuracy of the road friction coefficient μ estimated as the sum of the approximate friction coefficient μ and the friction coefficient μ fine adjusting value.

Figure 15:
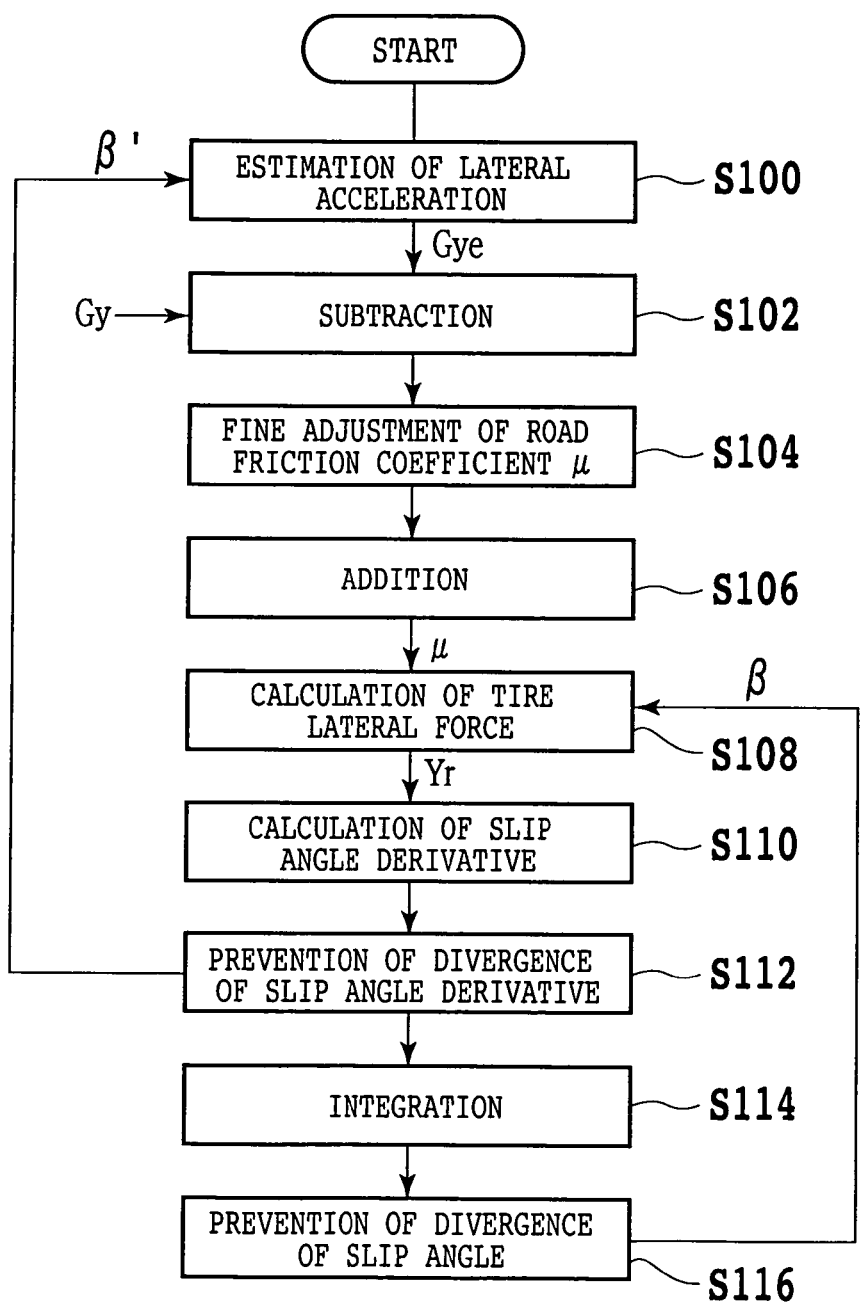
FIG. 15 is a flowchart showing a vehicle slip angle estimating method according to a preferred embodiment of the present invention.
Figure 16:
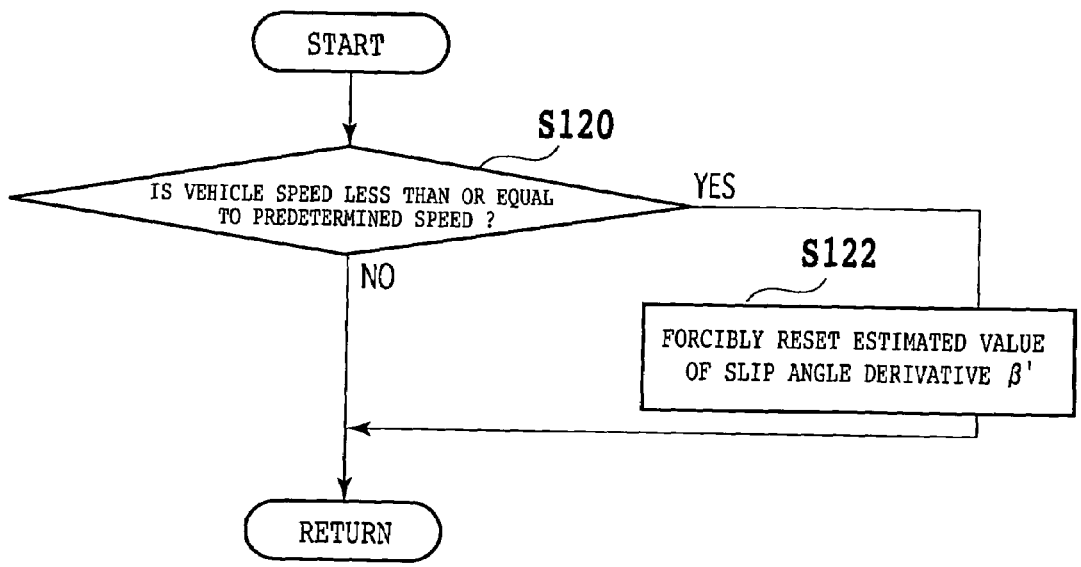
FIG. 16 is a flowchart showing a vehicle slip angle derivative divergence preventing method applicable to the method shown in FIG. 15.
Figure 17:
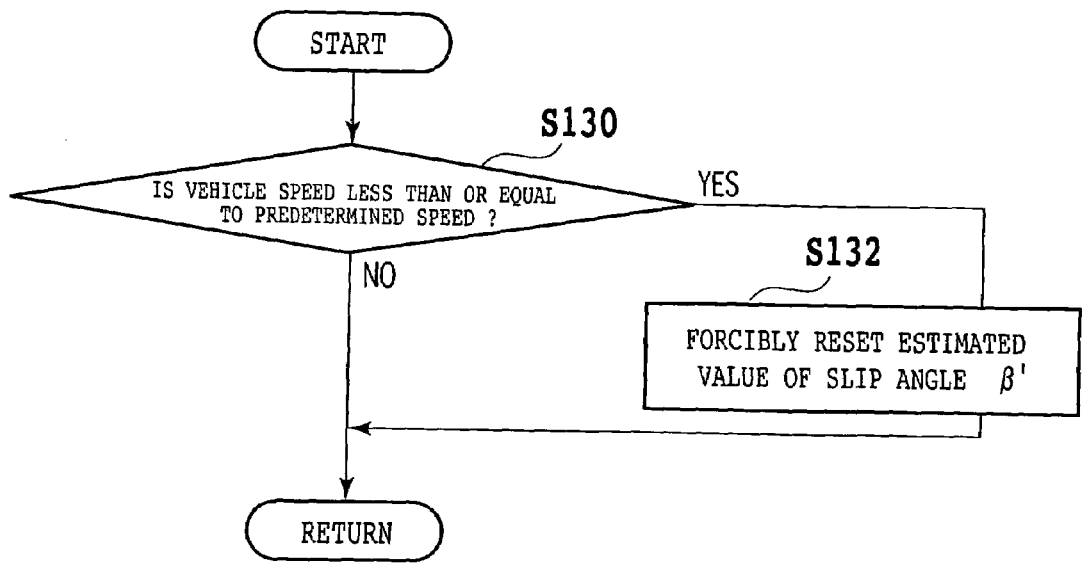
FIG. 17 is a flowchart showing a vehicle slip angle divergence preventing method applicable to the method shown in FIG. 15.

FIG. 15 is a flowchart showing a vehicle slip angle estimating method according to a preferred embodiment of the present invention. FIG. 16 is a flowchart showing a vehicle slip angle derivative divergence preventing method applicable to the method shown in FIG. 15. FIG. 17 is a flowchart showing a vehicle slip angle divergence preventing method applicable to the method shown in FIG. 15. The vehicle slip angle estimating method according to the present invention will now be described with reference to FIGS. 15 to 17.

In step S100, the lateral acceleration estimating section 60 calculates the estimated lateral acceleration $G_{ye}$ by applying to Eq. (2) shown above the previous slip angle derivative β' estimated in step S112, the detected vehicle speed V, and the detected yaw rate r. In step S102, the subtracter 62 subtracts the estimated lateral acceleration $G_{ye}$ from the detected lateral acceleration $G_y$.

In step S104, the friction coefficient μ fine adjusting section 66 adjusts the road friction coefficient μ in a given range on the basis of the approximate friction coefficient μ input from the approximate friction coefficient μ estimating section 64, thereby estimating the road friction coefficient μ. In step S106, the adder 68 adds the friction coefficient μ fine adjusting value input from the friction coefficient μ fine adjusting section 66 and the approximate friction coefficient μ input from the approximate friction coefficient μ estimating section 64, and outputs the result of this addition, μ as the estimated road friction coefficient μ to the tire lateral force computing section 70.

In step S108, the tire lateral force computing section 70 calculates a tire lateral force $Y_r$ acting on each rear tire by inserting a previous estimated value of the slip angle β calculated in step S116 into Eq. (3) or (4) derived from a tire dynamic model.

In step S110, the slip angle derivative computing section 72 calculates a slip angle derivative β' from Eq. (7) obtained by using Eqs. (5) and (6) describing the balance between forces in the lateral direction of the vehicle and the balance between moments about the vertical axis of the vehicle on the basis of a lateral force $Y_f$ acting on each front tire and a lateral force $Y_r$ acting on each rear tire and by eliminating the lateral force $Y_f$ from Eqs. (5) and (6).

In step S112, the slip angle derivative divergence preventing section 74 prevents the divergence of the slip angle derivative β' calculated in step S110. The processing of step S112 is shown in FIG. 16. In step S120 shown in FIG. 16, the slip angle derivative divergence preventing section 74 determines whether or not the vehicle speed V is less than or equal to a predetermined speed. If the vehicle speed V is less than or equal to the predetermined speed, the program proceeds to step S122, whereas if the vehicle speed V is greater than the predetermined speed, the program returns to step S114 shown in FIG. 15. In step S122, the estimated value of the slip angle derivative β' is forcibly reset to zero, and the program then returns to step S114 shown in FIG. 15.

In step S114 shown in FIG. 15, the integrator 76 integrates the slip angle derivative β' calculated in step S112 with respect to time, and outputs the integral to the slip angle divergence preventing section 78. In step S116, the slip angle divergence preventing section 78 prevents the divergence of the slip angle β calculated in step S114. The processing of step S116 is shown in FIG. 17. In step S130 shown in FIG. 17, the slip angle divergence preventing section 78 determines whether or not the vehicle speed V is less than or equal to the above predetermined speed.

If the vehicle speed V is less than or equal to the predetermined speed, the program proceeds to step S132, whereas if the vehicle speed V is greater than the predetermined speed, the program returns to step S100 shown in FIG. 15. In step S132, the estimated value of the slip angle β is forcibly reset to zero, and the program then returns to step S100 shown in FIG. 15. The above steps S100 to S116 are repeatedly executed.

Thus, the divergence of the estimated values of the slip angle derivative β' and the slip angle β can be prevented. According to the slip angle β, etc., target values for the torque to be distributed to the right and left front wheels $29_{FR}$ and $29_{FL}$ and the right and left rear wheels $29_{RR}$ and $29_{RL}$ are set by the target distributed torque setting device 42. Further, according to the target torque values output from the target distributed torque controlling device 42, the currents to be passed through the electromagnetic actuators respectively provided for the wheels $29_{FR}$, $29_{FL}$, $29_{RR}$ and $29_{RL}$ are controlled by the target distributed torque control device 44. Accordingly, the divergence of a command for each electromagnetic actuator can be prevented, so that the instability of the behavior due to the divergence can be avoided to prevent the motional condition of the vehicle from being well controlled While the slip angle estimating method shown in FIG. 3 according to a preferred embodiment of the present invention has been described, any other methods are applicable provided that the present value of the slip angle β is estimated by regressively using the previous estimated value of the slip angle β on the basis of a tire dynamic model according to the vehicle speed V. For example, an integrator 43 shown in FIGS. 4 to 6, 8, and 12 in Japanese Patent No. 2003-306092 may be provided between the slip angle derivative divergence preventing section 74 and the slip angle divergence preventing section 78.

Thus, the road friction coefficient μ can be accurately estimated, thereby improving the accuracy of the slip angle derivative β' and the slip angle β. Target values for the torque to be distributed to the right and left front wheels $29_{FR}$ and $29_{FL}$ and the right and left rear wheels $29_{RR}$ and $29_{RL}$ are set by the target distributed torque setting device 46 according to the slip angle β estimated by the slip angle estimating device 42, the yaw rate r detected by the yaw rate sensor 34, the lateral acceleration $G_y$ detected by the lateral acceleration sensor 33, the vehicle speed V detected by the vehicle speed sensor 32, the counter steer flag CS output from the counter steer detecting device 40, and the drive torque calculated by the engine ECU 44.

According to the target torque values output from the target distributed torque setting device 46, the currents to be passed through the electromagnetic actuators respectively provided for the wheels $29_{FR}$, $29_{FL}$, $29_{RR}$, and $29_{RL}$ are controlled by the target distributed torque set device 48. Accordingly, the motional condition of the vehicle can be controlled accurately.

Figure 18:
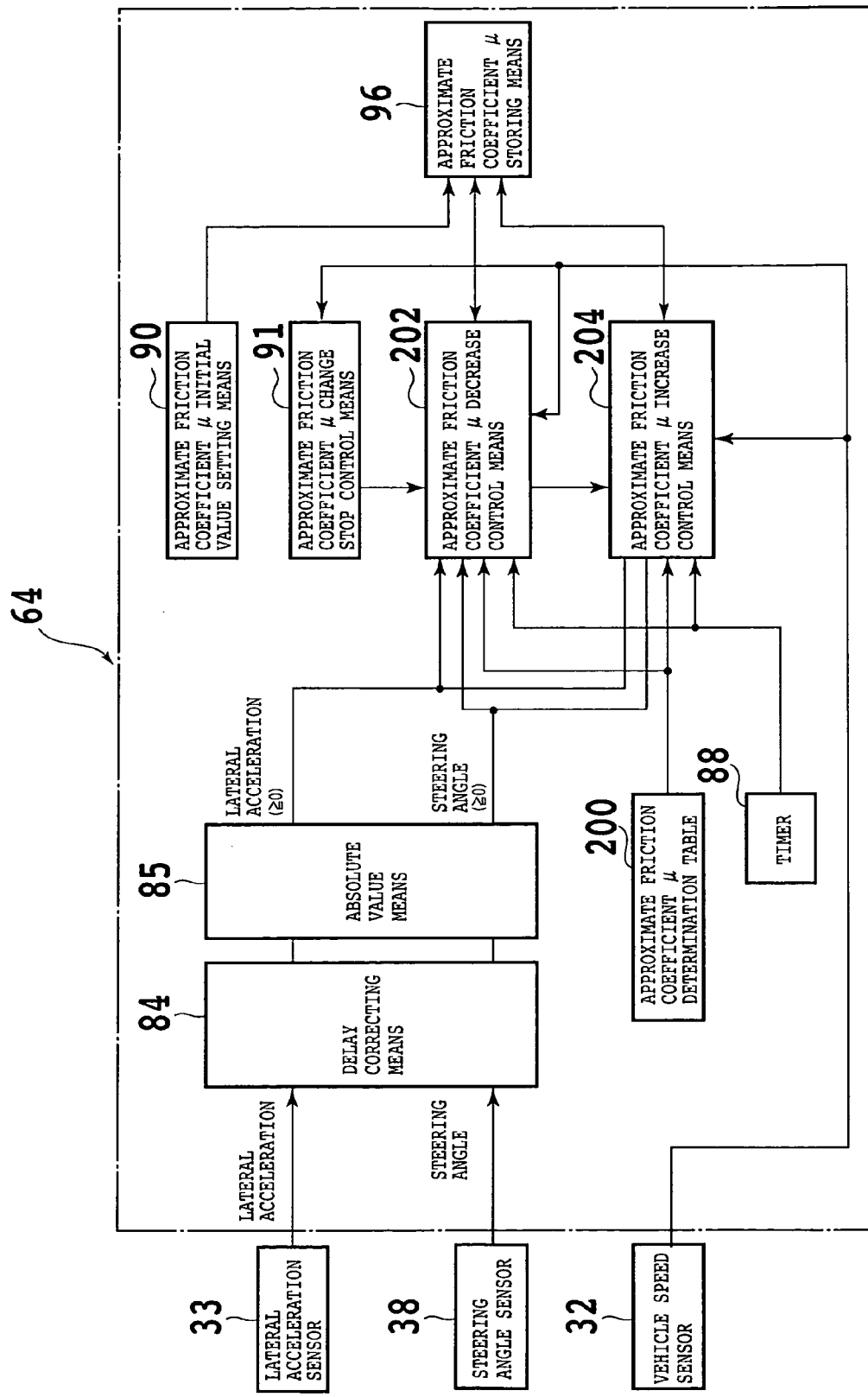
FIG. 18 is a block diagram showing a modification of the approximate friction coefficient μ estimating section shown in FIG. 4.

FIG. 18 is a block diagram showing a modification of the approximate friction coefficient μ estimating section 64 shown in FIG. 4. In FIG. 18, substantially the same components as those shown in FIG. 4 are denoted by the same reference numerals. The approximate friction coefficient μ estimating section 64 shown in FIG. 18 differs from that shown in FIG. 4 in that the multiplier 80 and the correction table 82 shown in FIG. 4 are not provided. Further, the approximate friction coefficient μ estimating section 64 includes a plurality of approximate friction coefficient μ determination tables 200 different from the approximate friction coefficient μ determination table 86 shown in FIG. 4, an approximate friction coefficient μ decrease control means 202 different from the approximate friction coefficient μ decrease control means 92 shown in FIG. 4, and an approximate friction coefficient μ increase control means 204 different from the approximate friction coefficient μ increase control means 94 shown in FIG. 4.

Figure 19:
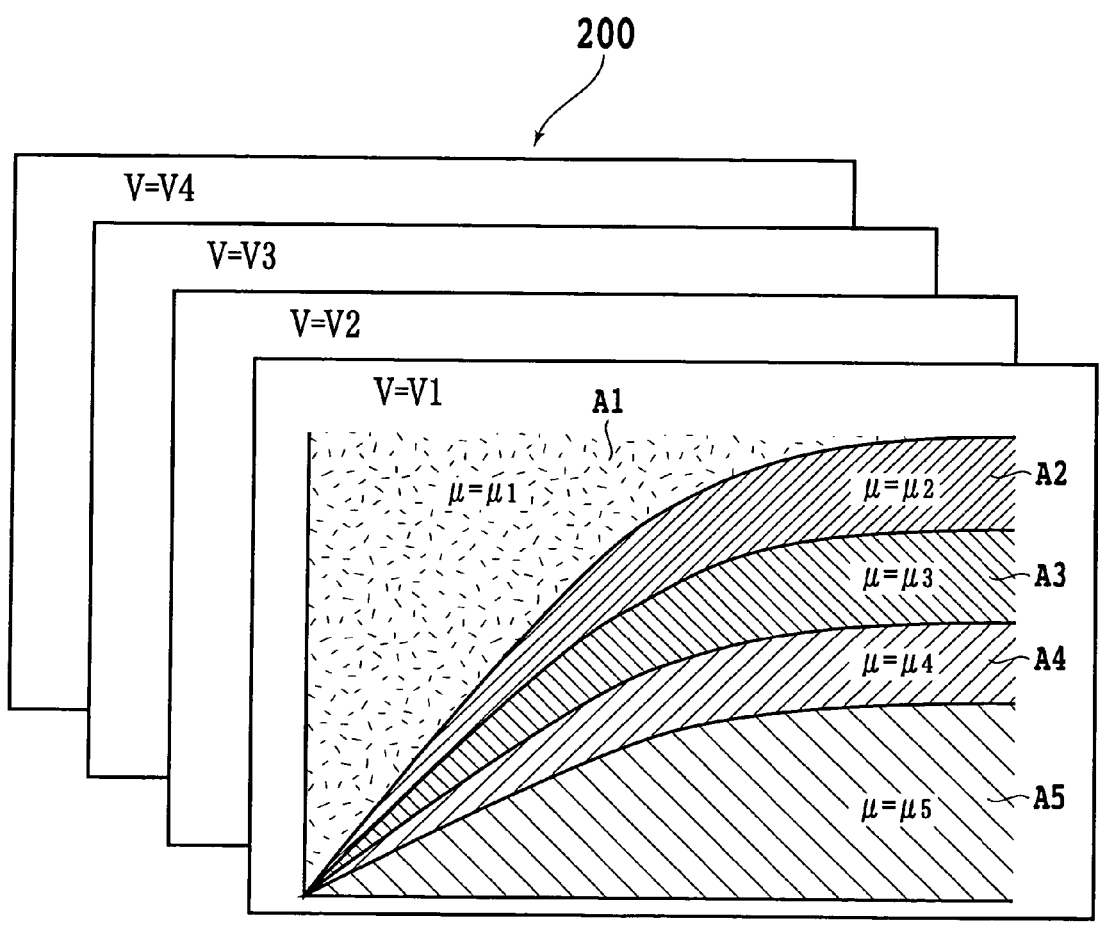
FIG. 19 is a schematic illustration of approximate friction coefficient μ determination tables shown in FIG. 18.

FIG. 19 shows the configuration of the plural approximate friction coefficient μ determination tables 200 shown in FIG. 18. As shown in FIG. 19, the plural approximate friction coefficient μ determination tables 200 respectively correspond to a plurality of vehicle speeds, and each table 200 defines a plurality of regions A1 to A5 respectively corresponding to a plurality of approximate friction coefficients μ1 to μ5 in a coordinate system using steering angle along the horizontal axis and lateral acceleration along the vertical axis.

For example, the four approximate friction coefficient μ determination tables 200 respectively correspond to four vehicle speeds V1 to V4 as shown in FIG. 19. The steering angle in FIG. 19 is not a steering angle corrected with respect to a reference vehicle speed as on the approximate friction coefficient μ determination table 86 shown in FIG. 7, but a steering angle detected by the steering angle sensor 38. By increasing the number of vehicle speeds to be defined on the tables, the region according to the combination of steering angle and lateral acceleration can be accurately detected to thereby improve the accuracy of estimation of the approximate friction coefficient μ.

The approximate friction coefficient μ decrease control means 202 refers to one of the plural approximate friction coefficient μ determination tables 200 defined for a vehicle speed nearest to the vehicle speed V detected by the vehicle speed sensor 32 to calculate an approximate friction coefficient μ in the region according to the steering angle and the lateral acceleration input from the absolute value means 85. The other operations of the approximate friction coefficient μ decrease control means 202 are the same as those of the approximate friction coefficient μ decrease control means 92 shown in FIG. 4.

Similarly, the approximate friction coefficient μ increase control means 204 refers to one of the plural approximate friction coefficient μ determination tables 200 defined for a vehicle speed nearest to the vehicle speed V detected by the vehicle speed sensor 32 to calculate an approximate friction coefficient μ in the region according to the steering angle and the lateral acceleration input from the absolute value means 85. The other operations of the approximate friction coefficient μ increase control means 204 are the same as those of the approximate friction coefficient μ increase control means 94 shown in FIG. 4.

In this manner, the plural approximate friction coefficient μ determination tables 200 may be prepared on the basis of a plurality of vehicle speeds without correcting the steering angle detected by the steering angle sensor 38 with respect to a reference vehicle speed. In this case, one of the plural approximate friction coefficient μ determination tables 200 defined for a vehicle speed nearest to the vehicle speed V detected by the vehicle speed sensor 32 is referred to, thereby calculating the approximate friction coefficient μ in the region according to the steering angle and the lateral acceleration input from the absolute value means 85.

What is claimed is:

1. A method for estimating a road friction coefficient μ of a vehicle, comprising the steps of:
    detecting a steering angle of the vehicle by a steering angle sensor;
    detecting a lateral acceleration of the vehicle by a lateral acceleration sensor; and
    calculating an approximate friction coefficient μ by referring to a road friction coefficient μ determination table comprising a plurality of regions each composed of steering angle and lateral acceleration, wherein each of said regions respectively correspond to one of a plurality of road friction coefficients μi (i=1 to n, n is an integer not less than 2) on the basis of a boundary line derived from lower limits of the lateral acceleration over various values of the steering angle, and selecting one of said regions according to the steering angle detected by said steering angle sensor and the lateral acceleration detected by said lateral acceleration sensor, wherein said corresponding road friction coefficient μi of said selected region is said approximate friction coefficient μ, wherein said step of calculating said approximate friction coefficient μ comprises the steps of detecting a straight running condition and increasing said approximate friction coefficient μ by one step when said straight running condition has been detected for more than a predetermined time and maintaining said approximate friction coefficient μ which is increased by one step until a non-straight running condition is detected.

2. The estimating method according to claim 1, further comprising the step of adjusting the road friction coefficient μ on the basis of said approximate friction coefficient μ so that the difference between an estimated lateral acceleration and the lateral acceleration detected by said lateral acceleration sensor becomes zero.

3. The estimating method according to claim 2, wherein said step of calculating said approximate friction coefficient μ comprises the step of filtering the steering angle detected by said steering angle sensor and the lateral acceleration detected by said lateral acceleration sensor so that the delay characteristic of the steering angle from the lateral acceleration becomes larger.

4. The estimating method according to claim 3, comprising a step of detecting a vehicle speed by a vehicle speed sensor;
    said road friction coefficient μ determination table being either one of a plurality of tables prepared on the basis of a plurality of vehicle speeds and selectively used according to the vehicle speed detected by said vehicle speed sensor or a predetermined table using a corrected steering angle obtained by correcting the steering angle detected by said steering angle sensor with a correction coefficient according to the vehicle speed detected by said vehicle speed sensor,
    wherein the correction coefficient is substantially linear to the vehicle speed.

5. The estimating method according to claim 4, comprising the step of detecting a vehicle speed by a vehicle speed sensor;
    said step of calculating said approximate friction coefficient μ comprising the step of stopping the change of said approximate friction coefficient μ when the vehicle speed detected by said vehicle speed sensor is not greater than a predetermined value.

6. The estimating method according to claim 5, wherein said step of calculating said approximate friction coefficient μ comprises the step of decreasing said approximate friction coefficient μ when said approximate friction coefficient μ stays for more than a predetermined time in the region where it is smaller than a present estimated value of said approximate friction coefficient μ.

7. The estimating method according to claim 2, wherein said road friction coefficients μi (i=1 to n) are defined with a constant step set between any adjacent ones of said road friction coefficients μi; and
    the absolute value of each of upper and lower limits of an adjusting value used in said step of adjusting the road friction coefficient μ is equal to or greater than said constant step.

8. The estimating method according to claim 7, wherein said step of adjusting the road friction coefficient μ comprises the step of performing the adjustment of the road friction coefficient μ when the lateral acceleration detected by said lateral acceleration sensor is greater than a present estimated value of said approximate friction coefficient μ multiplied by a constant value.

9. The estimating method according to claim 8, wherein said step of adjusting the road friction coefficient μ comprises the steps of determining whether or not the present estimated value of said approximate friction coefficient μ has varied and resetting said adjusting value to zero when the present estimated value has varied.

10. The estimating method according to claim 9, wherein said step of adjusting the road friction coefficient μ comprises the step of stopping the adjustment of the road friction coefficient μ when counter steer has been detected.

11. The estimating method according to claim 10, wherein said step of calculating said approximate friction coefficient μ comprises the step of increasing said approximate friction coefficient μ when the lateral acceleration detected by said lateral acceleration sensor is greater than a present estimated value of said approximate friction coefficient μ.

12. A method for estimating a road friction coefficient μ of a vehicle, comprising the steps of:
    detecting a steering angle of the vehicle by a steering angle sensor;
    detecting a lateral acceleration of the vehicle by a lateral acceleration sensor;
    calculating an approximate friction coefficient μ by referring to a road friction coefficient μ determination table comprising a plurality of regions each composed of steering angle and lateral acceleration, wherein each of said regions respectively correspond to one of a plurality of road friction coefficients μi (i=1 to n, n is an integer not less than 2) on the basis of a boundary line derived from lower limits of the lateral acceleration over various values of the steering angle, and selecting one of said regions according to the steering angle detected by said steering angle sensor and the lateral acceleration detected by said lateral acceleration sensor, wherein said corresponding road friction coefficient μi of said selected region is said approximate friction coefficient μ; and
    detecting a vehicle speed of the vehicle by a vehicle speed sensor, wherein
    said road friction coefficient μ determination table is either one of a plurality of tables prepared on the basis of a plurality of vehicle speeds and selectively used according to the vehicle speed detected by said vehicle speed sensor or a predetermined table using a corrected steering angle obtained by correcting the steering angle detected by said steering angle sensor with a correction coefficient according to the vehicle speed detected by said vehicle speed sensor, and the correction coefficient is substantially linear to the vehicle speed of the vehicle, and said step of calculating said approximate friction coefficient $\mu$ comprises the steps of detecting a straight running condition and increasing said approximate friction coefficient $\mu$ by one step when said straight running condition has been detected for more than a predetermined time and maintaining said approximate friction coefficient $\mu$ which is increased by one step until a non-straight running condition is detected.

* * * * *